United States Patent
Hsu et al.

(10) Patent No.: US 11,541,616 B2
(45) Date of Patent: Jan. 3, 2023

(54) METHODS AND SYSTEMS FOR MAKING AN OPTICAL FUNCTIONAL FILM

(71) Applicants: Roger Wen Yi Hsu, Rancho Cucamonga, CA (US); Daniel Hsu, Rancho Cucamonga, CA (US)

(72) Inventors: Roger Wen Yi Hsu, Rancho Cucamonga, CA (US); Daniel Hsu, Rancho Cucamonga, CA (US)

( * ) Notice: Subject to any disclaimer, the term of this patent is extended or adjusted under 35 U.S.C. 154(b) by 0 days.

(21) Appl. No.: 17/019,243

(22) Filed: Sep. 12, 2020

(65) Prior Publication Data

US 2021/0080753 A1  Mar. 18, 2021

Related U.S. Application Data

(63) Continuation-in-part of application No. 15/895,564, filed on Feb. 13, 2018, now Pat. No. 10,807,328, which is a continuation-in-part of application No. 14/886,078, filed on Oct. 18, 2015, now Pat. No. 10,611,106, which is a continuation-in-part of
(Continued)

(51) Int. Cl.
*B29D 11/00* (2006.01)
*G02C 7/10* (2006.01)
*G02B 1/08* (2006.01)
*G02C 7/12* (2006.01)
(Continued)

(52) U.S. Cl.
CPC .... *B29D 11/00432* (2013.01); *B29D 11/0073* (2013.01); *B29D 11/00644* (2013.01); *B29D 11/00788* (2013.01); *B29D 11/00913* (2013.01); *G02B 1/08* (2013.01); *G02C 7/108* (2013.01); *G02C 7/12* (2013.01); *B29K 2029/04* (2013.01); *B29K 2067/003* (2013.01); *B29K 2995/002* (2013.01); *B29K 2995/0026* (2013.01); *B29K 2995/0034* (2013.01); *G02C 2202/16* (2013.01)

(58) Field of Classification Search
CPC ........ B29D 11/00432; B29D 11/00644; B29D 11/0073; B29D 11/00788; B29D 11/00913; G02C 7/108; G02C 7/12; G02B 1/08
See application file for complete search history.

(56) References Cited

U.S. PATENT DOCUMENTS 10,611,106 B2 * 4/2020 Hsu ................. B29D 11/00644
10,807,328 B2 * 10/2020 Hsu ................. B29D 11/00644
(Continued)

*Primary Examiner* — Mathieu D Vargot
(74) *Attorney, Agent, or Firm* — Zhen Law Firm; Chris J. Zhen

(57) ABSTRACT

Methods and apparatus are provided for eyeglass lens made using a solution casting process. The method may include providing a first soluble polymer solution. The method may include providing a first dye solution including at least one dye. The method may include adding the first dye solution to the first soluble polymer solution to form a first dyed solution. The method may include casting the first dyed solution to form a first film. The method may include providing a second soluble polymer solution. The method may include providing a second dye solution comprising at least one dye. The method may include adding the second dye solution to the second soluble polymer solution to form a second dyed solution. The method may include casting the second dyed solution onto the first film to form a two-layer film. The method may include laminating or casting the two-layer film to the eyeglass lens.

15 Claims, 12 Drawing Sheets

Related U.S. Application Data application No. 14/806,579, filed on Jul. 22, 2015, now abandoned.

(60) Provisional application No. 62/116,545, filed on Feb. 15, 2015.

(51) Int. Cl.
*B29K 29/00* (2006.01)
*B29K 67/00* (2006.01)

(56) References Cited

U.S. PATENT DOCUMENTS

| | | | |
|---|---|---|---|
| 2002/0005509 A1* | 1/2002 | Teng | H01J 11/44 |
| | | | 252/582 |
| 2009/0297787 A1* | 12/2009 | Hanney | H01J 37/3277 |
| | | | 428/174 |
| 2013/0088772 A1* | 4/2013 | Hsu | G02C 7/10 |
| | | | 359/352 |

* cited by examiner 1. 0.15% of organic NIR DYE in mixture
2. 0.20% of organic NIR DYE in mixture
3. 0.42% of organic NIR DYE in mixture
4. 0.60% of organic NIR DYE in mixture

METHODS AND SYSTEMS FOR MAKING AN OPTICAL FUNCTIONAL FILM

CROSS-REFERENCE TO RELATED DISCLOSURES

This continuation in part application claims the benefit of priority to the filing date of U.S. patent application Ser. No. 15/895,564 "Methods and Systems for Making an Optical Functional Film" which was filed on Feb. 13, 2018 now U.S. Pat. No. 10,807,328, that is a continuation in part application that claims the benefit of priority to the filing date of U.S. patent application Ser. No. 14/886,078 "Methods and Systems for Making an Optical Functional Film" which was filed on Oct. 18, 2015 and issued Apr. 7, 2020 as U.S. Pat. No. 10,611,106 that is a continuation in part application that claims the benefit of priority to the filing date of U.S. patent application Ser. No. 14/806,579 "Methods And Systems For Making An Optical Functional Film" which was filed on Jul. 22, 2015 that claims the benefit of priority under 35 U.S.C. 119(e) to the filing date of U.S. Provisional Patent Application No. 62/116,545 "Solution Casting Method" which was filed on Feb. 15, 2015, all of which are incorporated herein by reference in their entirety.

TECHNICAL FIELD

This disclosure generally relates to an optical component and is particularly directed to methods and systems of making functional plastic film, functional polymer film, functional polyvinyl alcohol (PVA) film or functional polyethylene terephthalate (PET) film.

BACKGROUND

It is well known that ultraviolet (UV) light may cause serious flash burns to the cornea from high intensity light sources. Thus, eyes may require protection from these harmful UV lights. Eyes may need protection from UV lights during welding, when exposed to sunlight at elevation above 5000 ft (1524 m), or when the sun glares off snow or water, tanning, etc.

Infrared (IR) may also be harmful. Wireless communication, appliances, computers, lights, and natural resources, such as sunlight, may emit different levels of harmful radiation. IR may make up over half of the thermal-spectrum radiation in sunlight. At zenith, sunlight may provide an irradiance of approximately 1 kilowatt per square meter at sea level, of which 527 watts is IR radiation. Once the sunlight reaches the surface of Earth, almost all thermal radiation may be IR.

The energy of sunlight on the ground may be categorized into approximately 3% UV rays, 44% visible rays, and 53% IR rays. Therefore, when exposed to intense sunlight for a lengthy period of time without protection, eyes may experience a burning or stinging sensation that is often accompanied by fatigue. Such discomfort may be especially noticeable for those wearing contact lenses as contact lenses may absorb IR and "warm up." Eye doctors may encourage a habit of wearing sunglasses when staying out in the sun for a period.

Traditionally, to block harmful rays from a light source, protection lenses may be coated with one or more layers of IR and/or visible dyes. Usually, soluble dyes and/or metallic oxide pigments may be used for coating to absorb or reflect light of certain frequencies, e.g., IR frequencies, UV frequencies, etc. Thus, coated lenses may reduce or mitigate eye diseases such as cataract and glaucoma.

Because of the importance of sunglasses and protecting eyewear, many coating techniques have been invented. IR or visible coating may be applied by dipping or spraying a solvent IR or visible dyes on another optical layer of a lens. However, the curvature of most lenses may present a significant obstacle in the application of the IR or visible coating, as the application of the coating may be uneven and thus reduce the effectiveness of the protection layers.

Using traditional methods like extrusion or injection, IR or visible dyes may be added during the processes. Extrusion is a process that may be used to create objects of a fixed cross-sectional profile. A material may be pushed or pulled through a die of the desired cross-section. In a plastic extruding process, plastic may be first melted into a viscous, semi-liquid state. After it softens, the plastic may be pressed through a contoured opening. Using this technique, a curved lens may be created by pushing a softened optical film through a contoured opening.

Injection molding may be a manufacturing process for producing parts by injecting material into a mold. Material for the part may be fed into a heated barrel, mixed, and forced into a mold cavity, where it cools and hardens to the configuration of the cavity. For optical plastic films, whether it is an extrusion or injection method, heat may be used to soften the plastic films so they may be shaped curvaceously. Since dyes are sensitive to heat, some dye degradation may occur and the effectiveness of eye protection may be reduced.

Other issues regarding these IR or visible coated lenses are that they are easily scratched and that they are not resistant to chemicals or elements. Over time, the protection layers may lose their effectiveness and become harmful if not detected and replaced. To overcome this problem, lens manufacturers have begun spraying, dipping, or injecting another protection layer on top of the IR/visible layer. However, additional layers may make the lens thicker, which is a barrier for eyewear design and comfort.

Furthermore, traditional coating methods by injection or extrusion methods may be aesthetically less appealing because IR dye appears green in such a coating. In order to counteract or offset the undesirable green color, gray colors may be added to the PVA film. The addition of such gray colors, however, reduces the penetration of light, and therefore visibility, significantly. Finally, the addition of the gray colors to the PVA films on the lens may result in higher costs for the lenses and thus higher costs for the end products. Therefore, material and manufacturing processes for IR absorbing lenses that are inexpensive and quick may be desirable.

Recently, to overcome the drawbacks of extrusion and injection methods, a solution casting method has been invented and preferred. This manufacturing technology may be unique in that the process does not require conventional extrusion or injection molding technologies yet readily incorporates components and features traditionally produced by these processes. This method utilizes a mandrel, or inner diameter mold, that is immersed in a tank of polymer solution or liquid plastic that has been specifically engineered for the process. Due to a combination of thermal and frictional properties, the polymer solution then forms a thin film around the mold. The mold may then be extracted from the tank in a precise, controlled manner, followed by a curing or drying process.

Other casting devices used in a solution casting method are a belt or drum machines. Typically, supporting belts may be 1.0 to 2.0 m wide and 10 to 100 m long. Stainless steel belts may be between 1.0 and 2.0 mm thick. Drums are typically 4 to 8 m in diameter and 1.20 to 1.50 m wide. The belt channel may allow a stream of air to flow in machine or counter direction. The drum may be tightly sealed to prevent vapor emissions and to direct the air stream against the direction of drum movement. One of the two pulleys or drums may be connected to a drive that requires extremely accurate speed control to avoid even slight speed variations. One drum is connected to a servo system that may adjust belt tension in order to ensure constant flatness and the "absence" of belt movements (vibrations) in the critical area just behind the caster and to control the expansion and dilatation of the belt length caused by temperature changes. Belt machines may have a guide system to avoid belt shifting during operation. The belt may be guided by horizontal movements of the support drums. Many different support materials have been used for belts: copper, silver-plated copper, chromium-plated steel, stainless steel, metal coated with polyvinyl alcohol or gelatin, polyester film, polytetrafluoroethylene (PTFE) film and other polymer films.

At present, the most common support materials are stainless steel and chromium-plated surfaces. Important items for belt and drum machines are the material's heat conductivity, the technical processes used to create the required surface finish, and the options for repairing small surface defects. This cast technique may allow for the simple production of films with structured surfaces. The belt surface may be clearly and accurately replicated on one surface of the film. The techniques used to adapt the surface of the drums or belts to highly glossy, structured, or matt film finishes are proprietary methods.

Once the first layer of a thin film is appropriately solidified, secondary features may be added to the product, such as braided or coiled wire, laser-cut hypotubes or engineered metal reinforcements to prevent kinking, or imaging targets specific to the intended medical application. Multiple casting steps may then be repeated to encapsulate the reinforcements, build up wall thickness, add additional lumens, and optimize column strength. The part is then removed from the mold after it is cured or solidified. This method may work with liquid forms of solvent polymers without using excessive heat to cure the part. Since this method uses centrifugal force to shape the part, with the right liquidity ratio, a very thin layer of IR or visible dye solution may be added to an optical film without using excessive heat.

Another method to make the film is a static method, such as cavity mold, plate casting, or other similar methods.

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a method for manufacturing an eyeglass lens using a functional film is provided. The method may include providing a polyvinyl alcohol (PVA) material or polyvinyl butyral (PVB) material, and adding a portion of water to the PVA material or PVB material to make a solution. In addition, the method may include providing a portion of water-soluble blue blocker dye and enhance contrast dye, and adding a portion of water or methanol to the water-soluble dyes to make a dye solution. The method may include applying said dyed PVA or PVB solution onto a running belt inside a channel, allowing said dyed PVA or PVB solution to solidify as a thin optical film on said running belt by supplying air flow inside said channel, and controlling thickness, dryness, and absorption rate of the thin optical film by adjusting at least one of 1) direction of air flow, 2) belt speed, or 3) gap spacing of the belt channel, and removing said thin optical film from said running belt. The method may include laminating or casting the thin optical film to the eyeglass lens, where the PVA or PVB solution has a polymer concentration between 9% and 25%, inclusive, the dye solution has a dye concentration between 0.05% and 5%, inclusive; the eyeglass lens has an absorption rate in the blue blocker or the enhance contract, the absorption rate including 30% to 99% for lights with wavelengths of 400 nm to 455 nm, and more than 37% for lights with wavelengths of 570 nm to 595 nm, and more than 37% for lights with wavelengths of 760 nm to 2000 nm.

BRIEF DESCRIPTION OF DRAWINGS

The novel features of the disclosure are set forth in the appended claims. In the following descriptions, like parts are marked throughout the specification and drawings with the same numerals, respectively. The drawing figures are not necessarily drawn to scale, and certain figures may be shown in exaggerated or generalized form in the interest of clarity and conciseness. The disclosure itself, a preferred mode of use, further objectives, and advantages thereof, will be best understood by reference to the following detailed description of illustrative embodiments when read in conjunction with the accompanying drawings, wherein:

DESCRIPTION OF THE DISCLOSURE

Figure 1:
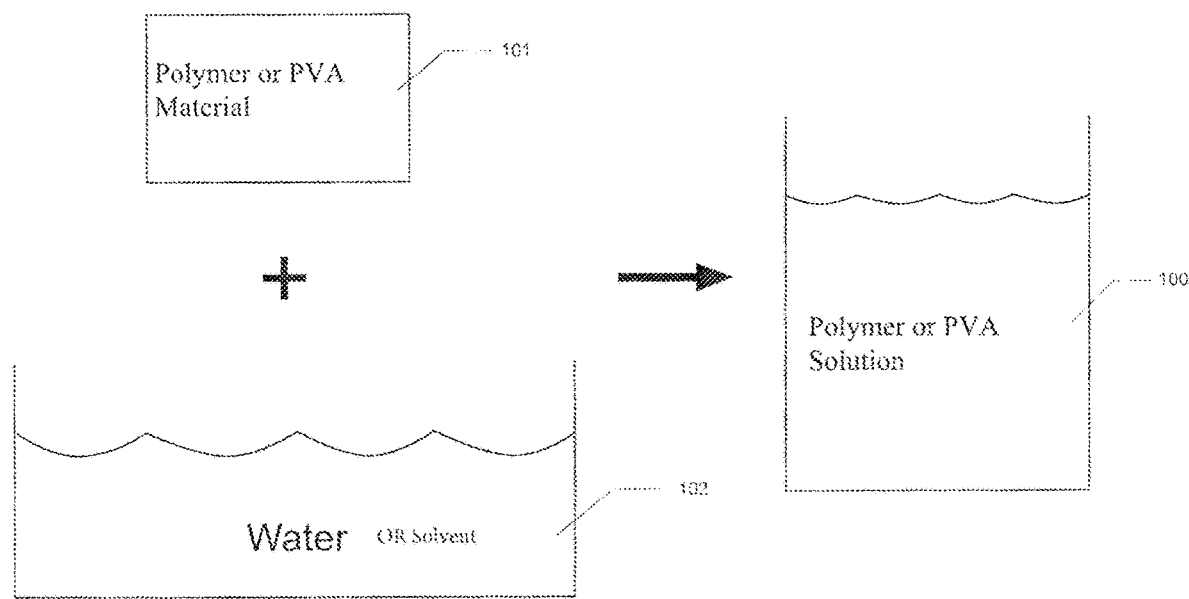
FIG. 1 is an illustrative view of the preparation of a polymer or PVA solution in a preferred solvent or water in accordance with one aspect of the present disclosure.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

A method to make a dyed functional film includes the steps of: providing a soluble polymer material, PVA powder, or PVA material; adding a solvent or water to the polymer material, PVA powder, or PVA material to make a soluble polymer or PVA solution; providing a soluble dye; adding a solvent to the IR and/or laser dye, photochromic, visible dye to make a soluble dye solution; adding the dye solution to the polymer or PVA solution; introducing the dyed polymer or PVA solution to a solution casting device; letting the solution casting device make a thin, dyed functional film from the dyed polymer or PVA solution; and removing the thin, dyed functional film from the casting device; letting the film dry and solidify.

In one embodiment, the dyed, functional film is dried in a temperature between 40-100° C. In another embodiment, the dyed, functional film thickness is between 0.0025 mm-2.0 mm.

In one aspect of the application, a method to manufacture a functional film is disclosed which comprises the steps of: providing a soluble polymer or a PVA material; adding a polymer solvent to the polymer or the PVA material to make a soluble polymer solution or a PVA solution; providing a soluble dye; adding a dye solvent to the soluble dye to make a soluble dye solution; adding the dye solution to the polymer solution or the PVA solution, thereby making a dyed polymer solution or a dyed PVA solution; introducing the dyed polymer solution or the dyed PVA solution to a solution casting device; allowing the solution casting device to make a thin, dyed optical film from the dyed polymer solution or the dyed PVA solution; removing the thin, dyed optical film from the device; allowing the thin, dyed optical film to dry and solidify. In one embodiment, the dyed optical film is dried at a temperature between 40-100° C. In one embodiment, the dyed optical film thickness is between 0.0025 mm-2.0 mm. In one embodiment, the polymer is selected from a group consisting of TAC, cellulose acetate, cellulose propionate, polyurethane, PVC, silicon urethane copolymer, acrylic, COP, tetrafluoroethylene polymer, PC, PP, PE, polyethersulfon, polyetherimide, polyvinylidene fluoride, etc., and is then added to an appropriate solvent, such as triphenyl phosphate, diphenyl phosphate, dichloromethane, methanol, resorcinol, tetraphenyl diphosphate, acetone, butanol, butyl acetate, butanol, biphenyl diphenyl phosphate, trichloromethane, MEK, EAC, IPA, MIBK, BCS, MCS, EAC, BAC, CYCLOHEXANONE, tetrahydrofuran, ether, esters, polyimides, dimethylformamide, polyvinylalcohol, methyl cellulose, Starch derivatives, gelatine, methyl-ethylketon, tetrahydrofuran, and methylene chloride. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, trichloromethane, MEK, EAC, IPA, MIBK, BCS, MCS, EAC, BAC, CYCLOHEXANONE, tetrahydrofuran, ether, esters, polyimides, dimethylformamide, polyvinylalcohol, methyl cellulose, starch derivatives, gelatine, methyl-ethylketon, tetrahydrofuran, methylene chloride, and water.

In one embodiment, the thin, dyed optical film can function as an eyewear lens, a vehicle window, a camera lens, a microscope lens, a building window, an electronic screen, or a lamp cover protection. In one embodiment, the thin, dyed optical film is laminated into a glass lens or a plastic lens. In one embodiment, a vacuum coating is applied to the thin, dyed optical film. In one embodiment, an anti-Reflective coating is applied to the thin, dyed optical film. In one embodiment, a hard coating is applied to the thin, dyed optical film. In one embodiment, a water-resistant coating is applied to the thin, dyed optical film. In one embodiment, a scratch resistant coating is applied to the thin, dyed optical film. In one embodiment, the thin, dyed optical film is stretched to become a PVA polarized film. In one embodiment, the soluble dye is selected from a group consisting of an IR dye, a visible dye, a photochromic dye, or an absorbing dye. In one embodiment, the IR dye is selected from a group consisting of tetrakis ammonium structure, iminium phthalocyanines, naphthalocyanines, metal complexes, azo dyes, anthraquinones, quadratic acid derivatives, immonium dyes, perylenes dianthrones cyanines heteroaromatics metal dithiolenes oxadiazoles phthalocyanines spiropyra tetraaryldiamines triarylamines, water soluble phthalocyanine and/or naphthalocyanine dye chromophores or a similar dye.

In another aspect of the application, a method to manufacture a functional film comprises the steps of: providing a soluble polymer; adding a polymer solvent to the soluble polymer to make a soluble polymer solution; providing a soluble dye; adding a portion of PVA material to the soluble polymer solution; adding a dye solvent to the soluble dye to make a soluble dye solution; adding the dye solution to the polymer solution, thereby making a dyed polymer solution; introducing the dyed polymer solution to a solution casting device; allowing the solution casting device to make a thin, dyed optical film from the dyed polymer solution; removing the thin, dyed optical film from the device; and allowing the thin, dyed optical film to dry and solidify.

In another aspect of the application, an eyewear lens comprising of a thin, dyed optical film is disclosed wherein the thin dyed optical film is made with a portion of dyed polymer solution in a solution casting device wherein the dyed polymer solution is comprised of a portion of soluble dye solution and a portion of soluble polymer solution wherein the soluble dye solution is comprised of a portion of soluble dye and a portion of dye solvent and wherein the soluble polymer solution is comprised of a portion of polymer solvent and a portion of soluble polymer.

In another aspect of the application, an eyewear lens comprising of a thin, dyed optical film is disclosed wherein the thin, dyed optical film is made with a portion of dyed PVA solution in a solution casting device wherein the dyed PVA solution is comprised of a portion of soluble dye solution and a portion of soluble PVA solution wherein the soluble dye solution is comprised of a portion of soluble dye and a portion of dye solvent and wherein the soluble PVA solution is comprised of a portion of polymer solvent and a portion of PVA material. In one embodiment, the soluble polymer is selected from a group consisting of TAC, cellulose acetate, cellulose propionate, polyurethane, PVC, silicon urethane copolymer, Acrylic, COP, tetrafluoroethylene polymer, PC, PP, PE, polyethersulfon, polyetherimide, polyvinylidene fluoride, etc., and is then added to an appropriate solvent, such as, triphenyl phosphate, diphenyl phosphate, dichloromethane, methanol, resorcinol, tetraphenyl diphosphate, acetone, butanol, butyl acetate, butanol, biphenyl diphenyl phosphate, trichloromethane, MEK, EAC, IPA, MIBK, BCS, MCS, EAC, BAC, CYCLOHEXANONE, tetrahydrofuran, ether, esters, polyimides, dimethylformamide, polyvinylalcohol, methyl cellulose, starch derivatives, gelatine, methyl-ethylketon, tetrahydrofuran, and methylene chloride. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, trichloromethane, MEK, EAC, IPA, MIBK, BCS, MCS, EAC, BAC, cyclohexanone, tetrahydrofuran, ether, esters, polyimides, dimethylformamide, polyvinylalcohol, methyl cellulose, starch derivatives, gelatine, methyl-ethylketon, tetrahydrofuran, methylene chloride, and water.

In one embodiment, soluble dye is selected from a group consisting of an IR dye, a visible dye, a photochromic dye, and an absorbing dye.

In one embodiment, the IR dye is selected from a group consisting of tetrakis ammonium structure, iminium phthalocyanines, naphthalocyanines, metal complexes, azo dyes, anthraquinones, quadratic acid derivatives, immonium dyes, perylenes dianthrones cyanines heteroaromatics metal dithiolenes oxadiazoles phthalocyanines spiropyra tetraaryldiamines triarylamines, water soluble phthalocyanine and/or naphthalocyanine dye chromophores.

In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, trichloromethane, MEK, EAC, IPA, MIBK, BCS, MCS, EAC, BAC, cyclohexanone, tetrahydrofuran, ether, esters, polyimides, dimethylformamide, polyvinylalcohol, methyl cellulose, starch derivatives, gelatine, methyl-ethylketon, tetrahydrofuran, methylene chloride, and water.

In one embodiment, soluble dye is selected from a group consisting of an IR dye, a visible dye, a photochromic dye, and an absorbing dye. In one embodiment, the IR dye is selected from a group consisting of tetrakis ammonium structure, Iminium phthalocyanines, naphthalocyanines, metal complexes, azo dyes, anthraquinones, quadratic acid derivatives, immonium dyes, perylenes dianthrones cyanines heteroaromatics metal dithiolenes oxadiazoles phthalocyanines spiropyra tetraaryldiamines triarylamines, water soluble phthalocyanine and/or naphthalocyanine dye chromophores.

In one aspect of the application, a method to manufacture a functional film comprises the steps of: providing a PVA material; adding a portion of water to said PVA material to make a PVA solution; providing a portion of water soluble near IR dye; adding a portion of water or methanol to said water soluble near IR dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; and allowing said thin dyed optical film to dry and solidify. In one embodiment, the dyed optical film is dried at a temperature between 40-100° C. In one embodiment, the dyed optical film thickness is between 0.015 mm-3.0 mm. In one embodiment, the water soluble near IR dye is selected from a group whose composition consists of a chemical formula of C38 H46 Cl N2 O6 S2 Na; or C43 H47 N2 O6 S2 Na; or C44 H52 N3 O6 S3 Na; or C38 H49 N3 O6 S4 Cl; C46 H51 N2 O6 S2 Cl; C52 H56 N3 O6 S3 Na. In one embodiment, the thin dyed optical film is capable of functioning as an eyewear lens, a vehicle window, a camera lens, a microscope lens, a building window, an electronic screen, a lamp cover protection, a phone screen, a TV screen, a computer screen, or an appliance equipment. In one embodiment, the thin, dyed optical film is laminated into a glass lens or a plastic lens. In one embodiment, a vacuum coating is applied to said thin, dyed optical film. In one embodiment, an anti-Reflective coating is applied to said thin, dyed optical film. In one embodiment, a hard coating is applied to said thin, dyed optical film. In one embodiment, a water-resistant coating is applied to said thin, dyed optical film. In one embodiment, a scratch resistant coating is applied to said thin, dyed optical film. In one embodiment, the thin, dyed optical film is stretched to become a PVA polarized film. In another aspect of the application, an eyewear lens comprising of a thin dyed optical film is disclosed wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble IR dye and a portion of water and wherein said PVA solution is comprised of a portion of water and a portion of PVA material. In another embodiment, the water soluble near IR dye is selected from a group whose composition consists of a chemical formula of C38 H46 Cl N20, S2 Na; or C43 H47 N2 O6 S2 Na; or C44 H52 N3 O6 S3 Na; or C38 H49 N3 O6 S4 Cl; C46 H51 N2 O6 S2 Cl; C52 H56 N3 O6 S3 Na. A method to manufacture a functional film comprising of the following steps is disclosed: providing a PVA material; adding a portion of water to said PVA material to make a PVA solution; providing a portion of water soluble near IR dye; adding a portion of water or methanol to said water soluble near IR dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; allowing said thin dyed optical film to dry and solidify. In another embodiment, the dyed optical film is dried at a temperature between 40-100° C. In another embodiment, the dyed optical film thickness is between 0.015 mm-3.0 mm. In another embodiment, the portion of water soluble near IR dye is selected from a group whose composition consists of a chemical formula of C38 H46 Cl N2 O6 S2 Na; or C43 H47 N2 O6 S2 Na; or C44 H52 N3 O6 S3 Na; C38 H49 N3 O6 S4 Cl; C46 H51 N2 O6 S2 Cl; C52 H56 N3 O6 S3 Na.

In another embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment. In another embodiment, the thin dyed optical film is laminated to a glass lens or a plastic lens. In another embodiment, the vacuum coating is applied to said thin dyed optical film. In another embodiment, an anti-Reflective coating is applied to said thin dyed optical film. In another embodiment, a hard coating is applied to said thin dyed optical film. In another embodiment, a water-resistant coating is applied to said thin dyed optical film. In another embodiment, a scratch resistant coating is applied to said thin dyed optical film. In another embodiment, the thin dyed optical film is stretched to become a PVA polarized film. In another aspect of the application, an eyewear lens comprising a thin dyed optical film wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble IR dye and a portion of water and wherein said PVA solution is comprised of a portion of water and a portion of PVA material. In another embodiment, the water soluble near IR dye is selected from a group with a chemical formula of C38 H46 Cl N20, S2 Na; or C43 H47 N2 O8 S2 Na; or C44 H52 N3 O8 S3 Na; or C38 H49 N3 O6 S4 Cl; C46 H51 N2 O8 S2 Cl; C52 H56 N3 O6 S3 Na.

In another aspect of the application, a method to manufacture a functional film is disclosed and comprises the steps of: providing a soluble polymer; adding a polymer solvent to said polymer to make a soluble polymer solution; providing a soluble dye; adding a dye solvent to said soluble dye to make a soluble dye solution; adding said dye solution to said polymer solution thereby making a dyed polymer solution; introducing said dyed polymer solution to a solution casting device; allowing said solution casting device to make a thin, dyed optical film from said dyed polymer solution; removing said thin, dyed optical film from said device; allowing said thin, dyed optical film to dry and solidify. In one embodiment, the dyed optical film is dried at a temperature between 40-150° C. In one embodiment, the dyed optical film thickness is between 0.015 mm-3.0 mm. In one embodiment, the polymer is selected from a group consisting of TAC, cellulose acetate, cellulose propionate, polyurethane, PVC, silicon urethane copolymer, acrylic, COP, tetrafluoroethylene polymer, PC, PP, PE, PET, polyethersulfon, polyetherimide, polyvinylidene fluoride, polyox (ethylene oxide), etc., and is then added to an appropriate solvent, such as triphenyl phosphate, diphenyl phosphate, dichloromethane, methanol, resorcinol, tetraphenyl diphosphate, acetone, butanol, butyl acetate, butanol, biphenyl diphenyl phosphate, trichloromethane, MEK, EAC, IPA, MIBK, BCS, MCS, EAC, BAC, CYCLOHEXANONE, tetrahydrofuran, ether, esters, polyimides, dimethylformamide, polyvinylalcohol, methyl cellulose, starch derivatives, gelatine, methylethylketon, tetrahydrofuran, methylene chloride, alcohol, phenol, o-chlorophenol, DMSO, trifluoroacetic acid (either pure or as mixtures with dichloromethane), 1,1,1,3,3,3-hexafluoro-2-propanol, o-chlorophenol, o-cresol, tetrachloroethane/phenol, dichloromethane (DCM) with a small amount of dioxane, nitrobenzene, etc. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, trichloromethane, MEK, EAC, IPA, MIBK, BCS, MCS, EAC, BAC, cyclohexanone, tetrahydrofuran, ether, esters, polyimides, dimethylformamide, polyvinylalcohol, methyl cellulose, starch derivatives, gelatine, methyl-ethyl-keton, tetrahydrofuran, methylene chloride, alcohol, phenol, o-chlorophenol, DMSO, trifluoroacetic acid (either pure or as mixtures with dichloromethane), 1,1,1,3,3,3-Hexafluoro-2-propanol, o-chlorophenol, o-cresol, tetrachloroethane/phenol, dichloromethane (DCM) with a small amount of dioxane, nitrobenzene, etc. In one embodiment, the thin, dyed optical film is laminated to a glass or plastic lens or sheet that forms at least one layer and is thereafter subject to a process of bending orco-injection. In one embodiment, the soluble dye is selected from a group consisting of an IR dye, a visible dye, a photochromic dye, or an absorbing dye. In one embodiment, a vacuum coating is applied to said thin, dyed optical film. In one embodiment, an anti-Reflective coating is applied to said thin, dyed optical film. In one embodiment, a hard coating is applied to said thin, dyed optical film. In one embodiment, a water-resistant coating is applied to said thin, dyed optical film. In one embodiment, a scratch resistant coating is applied to said thin, dyed optical film. In one embodiment, the thin dyed optical film is capable to function as an eyewear lens, a vehicle window, a camera lens, a microscope lens, a building window, an electronic screen, a lamp cover protection, a phone screen, a TV screen, a computer screen, or an appliance equipment.

Some embodiments are described in detail with reference to the related drawings. Additional embodiments, features, and/or advantages will become apparent from the ensuing description or may be learned by practicing the application. The following description is not to be taken in a limiting sense but is made merely for the purpose of describing the general principles of the application. The steps described herein for performing methods form one embodiment of the application, and, unless otherwise indicated, not all of the steps must necessarily be performed to practice the application, nor must the steps necessarily be performed in the order listed. It should be noted that references to "an" or "one" or "some" embodiment(s) in this disclosure are not necessarily to the same embodiment, and such references mean at least one.

In accordance with the practice of the present application, the methods and systems of making a functional film disclosed herein provides many important advantages over those of prior arts. Specifically, the current application yields a virtually isotropic, flat, and dimensionally stable functional film. Furthermore, the functional film achieves maximum optical purity and extremely low haze. The film is also dyed to a precise specification without being affected by dye degradation problems. As a result, the present functional film has less treatment, less defect, less delamination, and less stress, and, thus, the optical lens requires fewer layers, and process time is shorter. Although yielding many advantages, the current method uses readily incorporated mixture components used in traditional methods. The current application does not increase material costs, and, in certain cases, it actually reduces material costs because it yields accurate optical properties, specifications, and thinness in functional films, which, in turn, reduce the number of layers in an optical lens.

Referring to FIG. 1, a plastic polymer 101, such as TAC, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent 102, such as water, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a plastic polymer, such as TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, and Polyvinylidene fluoride, is added to an appropriate solvent 102, such as triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a PVA material 101 is added to an appropriate solvent 102, such as water, to form PVA solution.

Figure 2:
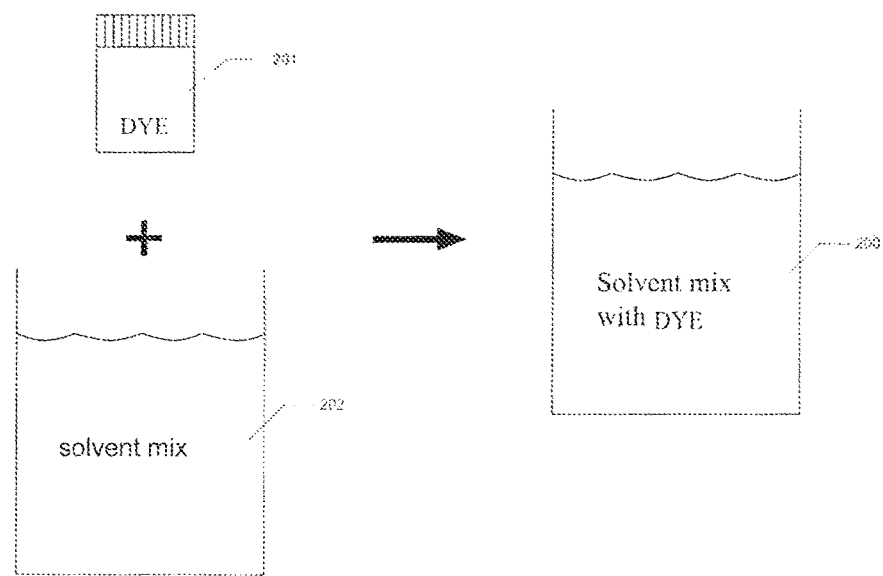
FIG. 2 is an illustrative view of the preparation of an IR dye and/or laser dye, photochromic, visible dye solution in a preferred solvent or water in accordance with one aspect of the present disclosure.

Referring to FIG. 2, a dye 201, such as IR and/or visible dye, photochromic dye, or any absorbing dyes, is added to an appropriate solvent 202, such as triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water, etc., to make the second solution 200, liquid B, a dye solution.

In another embodiment, a water-based dye 201, such as water soluble near IR dye, is added to an appropriate solvent 202, such as water or methanol, to form a water-soluble dye solution. In one embodiment, the water soluble near IR dye is a composition with a chemical formula of C38 H46 Cl N2 O6 S2 Na; or C43 H47 N2 O6 S2 Na; or C44 H52 N3 O6 S3 Na; or C38 H49 N3 O6 S4 Cl; C46 H51 N2 O6 S2 Cl; C52 H56 N3 O6 S3 Na. In another embodiment, the water soluble near IR dye is a near IR fluorescent dye. In another embodiment, the water soluble near IR dye is an Epolight™ 2735 water soluble dye.

Figure 3:
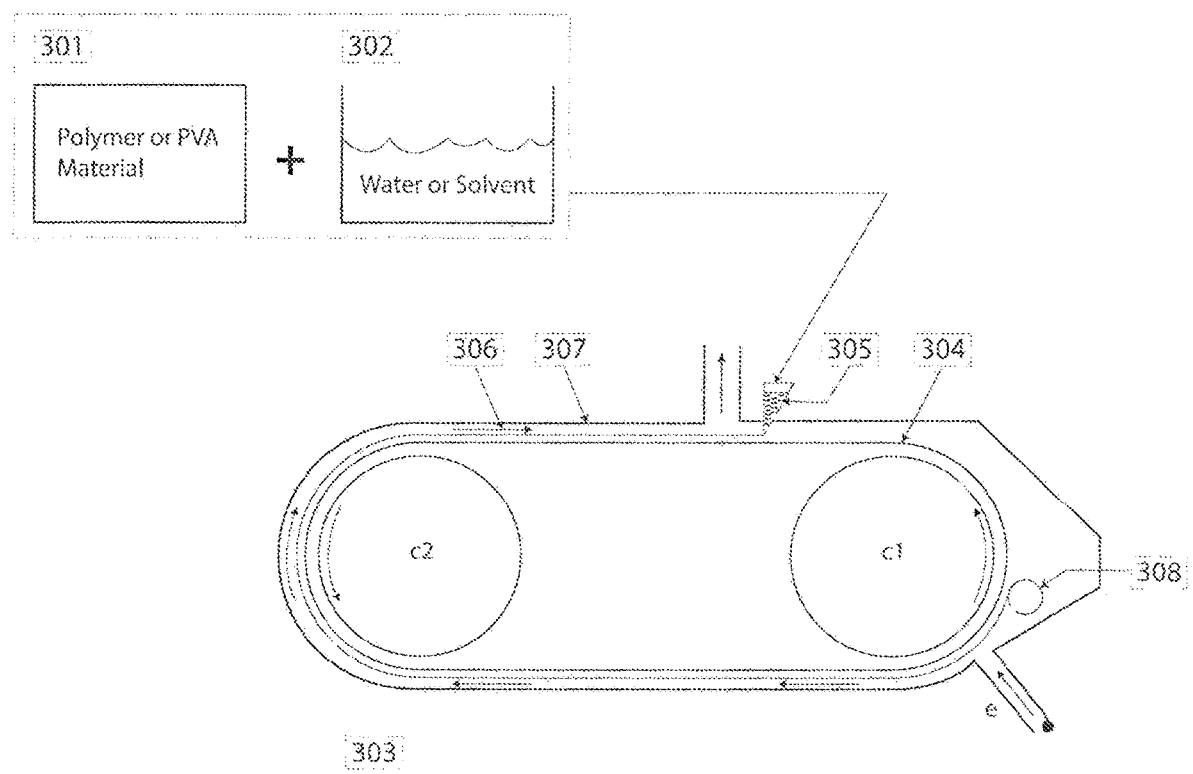
FIG. 3 is an illustrative view of a typical solution casting method and apparatus in accordance with one aspect of the present disclosure.

Referring to FIG. 3, the polymer casting method used in this application is depicted. Polymer material, PVA powder, or PVA material 301 is mixed with a solvent 302. In one embodiment, low heat under 100° C. may be used to speed up the dissolving of the polymer in the solvent. However, in another embodiment, other polymer materials, such as TAC, may not need any heat to dissolve. The solution may be further processed to arrive at the required solution for making a functional film with certain optical properties. The final polymer or PVA solution is then introduced to the casting device 303 as depicted. In one embodiment, the final polymer or PVA solution is deposited onto a moving belt 304 through a caster or spreader 305. The polymer or PVA solution is dried and solidified by a stream of air 306 flowing in a belt channel 307 against the direction of the moving belt. It is appreciated that, in other embodiments, the stream of air 306 may flow in the direction of the moving belt. It is also appreciated that dry air, its direction, belt speed, space of the belt channel, etc. are calibrated such that the functional film achieves a desired thickness, dryness, and other qualities. Moreover, by the time the functional film reaches the film take-off 308, the input polymer or PVA solution must be solidified enough to be taken off the belt for further drying or processing.

Figure 4:
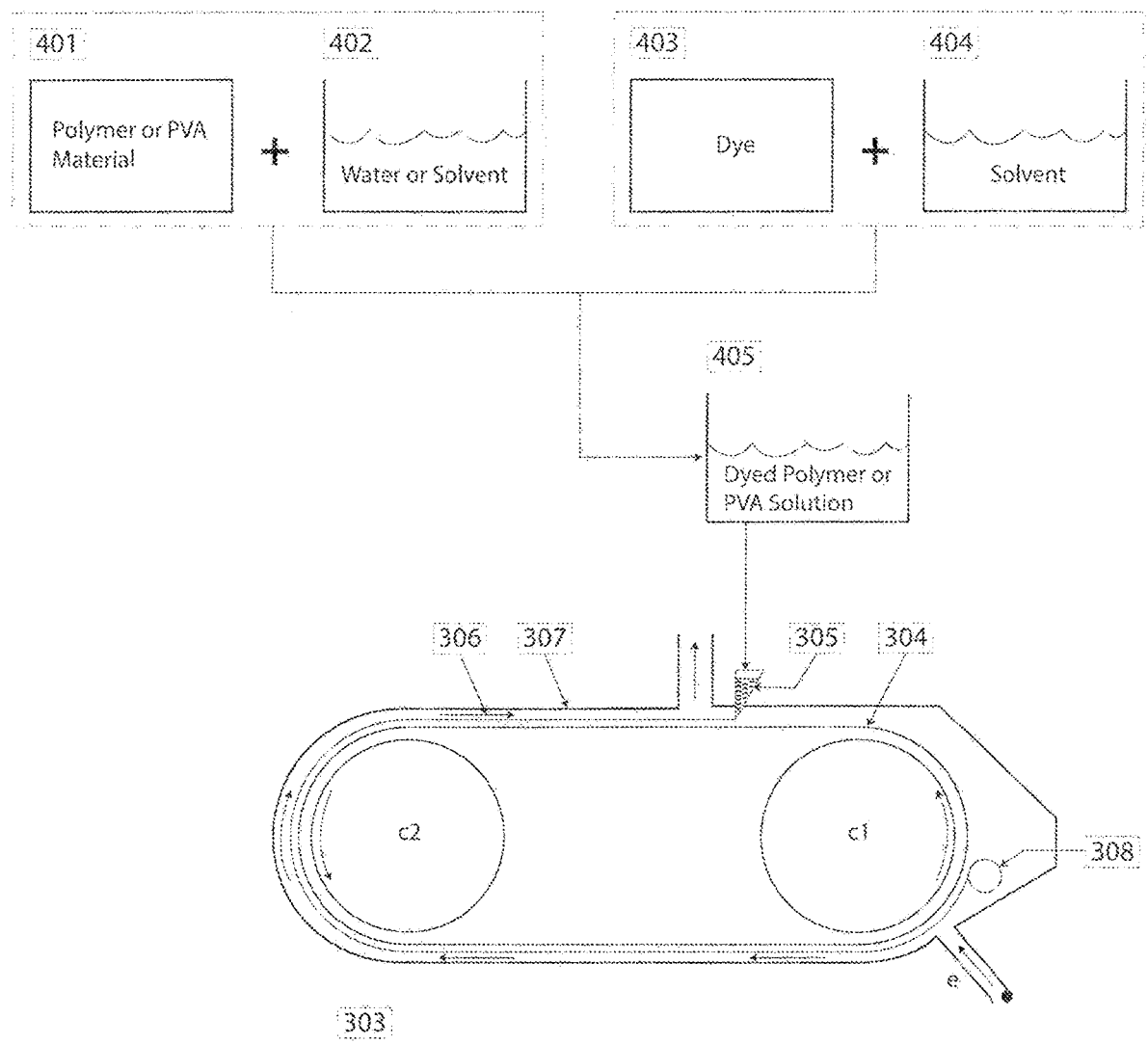
FIG. 4 is an illustrative view of the process of making a functional film using the Solution Casting Method in accordance with one aspect of the present disclosure.

Referring to FIG. 4, the casting method as depicted in FIG. 3 is adapted for this application. A liquid A, a polymer solution, is made by adding a polymer material 401 to an appropriate solvent 402. Liquid B, a dye solution, is made by adding a dye 403, which may be IR or visible dye, photochromic dye, or any absorbing dyes, to an appropriate solvent 404. In one embodiment, the Liquid B is comprised of 0.05%-5% IR or visible dye, photochromic dye, or absorbing dye, the rest being an appropriate solvent. In one embodiment, the preferred embodiment is Liquid B comprising 3% of the dye. The resulting solutions are mixed together to make dyed polymer solution 405. In one embodiment, water soluble PVA (polyvinyl alcohol) with IR dye may also contain no more than 10% of solvent soluble polymerin the mix. In one embodiment, the Liquid A is comprised of approximately 9% to 25% of Polymer or PVA powder and 75% to 91% of appropriate solvent.

In another embodiment, the casting method as depicted in FIG. 3 is adapted for this application. A PVA solution is made by adding a PVA material 401 to an appropriate water or methanol 402. Liquid B, a water-soluble dye solution, is made by adding a portion of water soluble near IR dye 403 to an appropriate water or methanol 404. In one embodiment, the Liquid B is comprised of 0.05%-5% of water soluble near IR dye, the rest being appropriate water or methanol. In one embodiment, the preferred embodiment is Liquid B comprising 3% of the dye. The resulting solutions are mixed together to make dyed PVA solution 405.

Figure 5:
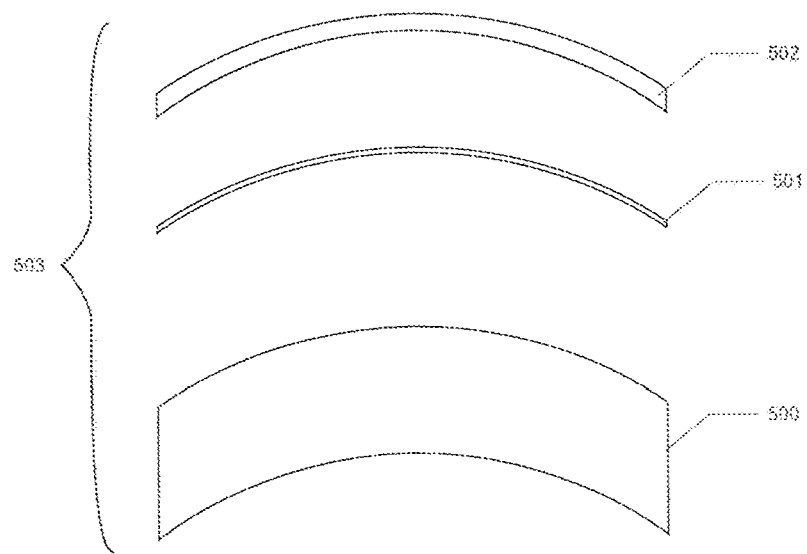
FIG. 5 is an illustrative view of laminating a new functional film as an optical component with other materials to make eyewear optical lenses, camera lenses, microscope lenses, car windows, building windows, electronic screens, lamp cover protection, etc. in accordance with one aspect of the present disclosure.
Figure 6:
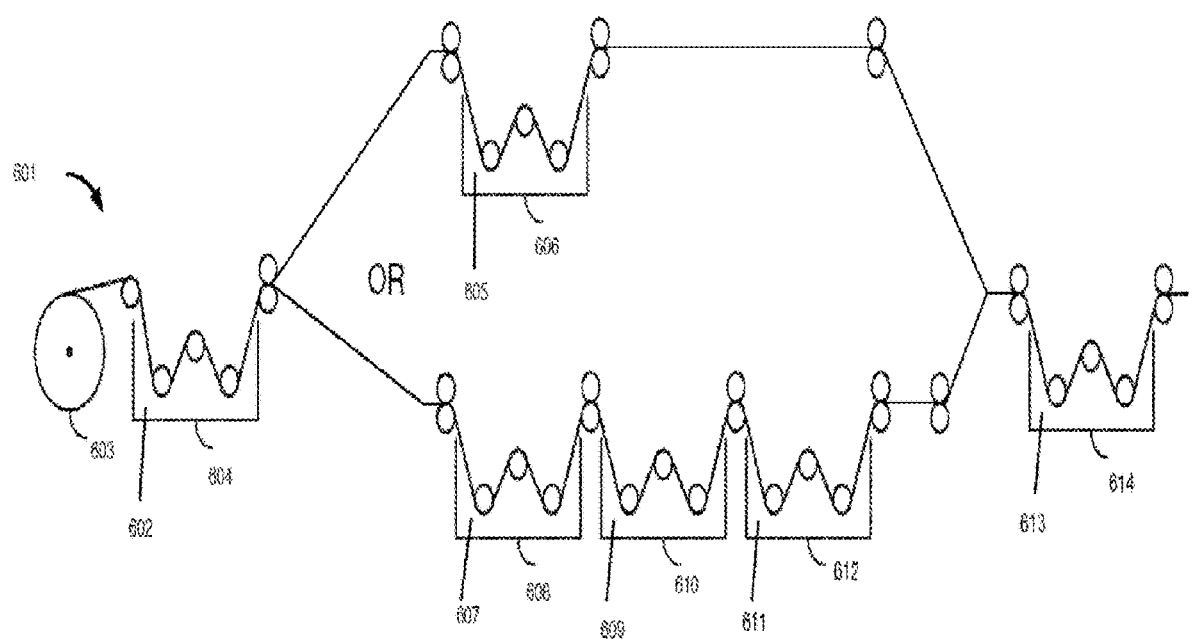
FIG. 6 is another embodiment of the present invention.

The dyed PVA solution or dyed polymer solution 405 is next introduced into a solution casting device 406. This device would utilize a large belt 407 whose material and design are made appropriate for a desired functional film. In a preferred embodiment, the film is introduced to a dry environment where the temperature is between 40-150° C. The functional film is continuously taken off the moving belt for further drying, processing, rolling or sheeting for storage until use. It is then used to produce an eyewear lens, camera lens, microscope lens, car window, building window, electronic screen, lamp cover protection, etc. In a preferred embodiment, the functional film thickness is between 0.015 mm-3.0 mm. Different films with different optical properties may be laminated together to obtain the desired eyewear lens, camera lens, microscope lens, car window, building window, electronic screen, lamp cover protection, etc. In one embodiment, referring to FIG. 5, a curved lens 503 is made wherein visible and/or IR dyed optical film 501, which is made using the present method as depicted in FIG. 3, is laminated on another clear film or glass 500, which has certain optical properties. Another scratch-resistant optical glass 502 is laminated on top of the dyed functional film 501 to protect the IR/visible layer from scratches, chemicals, and/or the elements.

In one embodiment, the process of making a functional film may use multi-head flow machines to cast the materials, use different dyes or materials, or have different formats.

In another embodiment, while the functional film is made, it may be stretched for orientation.

In another embodiment, the functional film has the physical characteristic of absorbing or reflecting 90% or more of lights with wavelengths of 400-430 nm and more than 37% of lights with wavelengths of 760-2000 nm.

In one embodiment, after the functional film is made using the adapted solution casting method, the functional film is formed to the curvature of the final product and may further be bounded with an epoxy layer via injection molding.

In another embodiment, the functional film is further laminated to another PVA film as an additional layer. This process may be repeated for multiple layers of PVA films to achieve the intended product design. It is appreciated that different functional films may also be laminated together to achieve certain optical properties.

In one embodiment, Solution casting method using a single layer of function film or extra laminate (one or more layers of function film) may also make the desired shape or curve to put in the mold for co-injection substrate (main support material).

In one embodiment, the functional film may be laminated on the top of, the bottom of, or in between any types of glass, plastic and/or metal objects.

In one embodiment, the functional film may be formed into any geometrical shapes or casting molds to achieve an intended design.

In one embodiment, PVA water solution material is used as its own polarized layer, and/or an additional polarized layer is laminated.

(Eyeglass lens, goggle lens, protective shield sheet), contain an organic dye of film wherein selective narrow-band visible dye, absorbed of unwanted radiation light, specially the lens product gets better low haze, Clarity, colorful enhance contrast.

And at least add one absorbed IR radiation of solution casting film.

The present application lens products reduce eye strain and increase visual comfort.

In another some embodiments, The Lens contains a solution casting function film or a plurality of a solution casting function film and a laminated film On Convex or (in other words) on top of the lens 0.0-1.5 mm deep into the surface with or without grinding but not damaging the function film, the lens total thickness is 0.2-10.0 mm, and/or with an IR thin film included or an extra 0.02-0.18 mm On Convex or on top, 0.001-1.5 mm deep into the surface, wherein one of the layers, with or without grinding, does not damage the function film, the lens total thickness is 0.2-10.0 mm.

Much of the energy from the Sun arrives on Earth in the form of IR radiation. Sunlight in space at the top of Earth's atmosphere at a power of 1366 watts/m2 is composed (by total energy) of about 50% IR light, 40% visible light, and 10% ultraviolet light. At ground level, this decreases to about 1120-1000 watts/m2, and consists of 44% visible light, 3% ultraviolet (with the Sun at the zenith (directly overhead) but less at other angles), and, the remainder, IR. Thus, sunlight's composition at ground level, per square meter, with the sun at the zenith, is about 527 watts of IR radiation, 445 watts of visible light, and 32 watts of ultraviolet radiation. The balance between absorbed and emitted IR radiation has a critical effect on the Earth's climate.

Three major potential factors that may damage human eyes in natural light are ultraviolet light, blue visible light, and near-IR radiation. Too many kinds of radiation together reach Earth at the same time.

Light waves from natural and artificial sources may be damaging to the human eye. Excessive exposure to harmful light may cause deterioration and irreversible damage to the sensitive parts of the eye.

Eyeglass lenses are used to protect the human eye against excessive solar radiation, reduce eye strain, and increase visual comfort. Standard lens treatment is applied with the intent to block out harmful light through the inclusion of colored dyes. These general treatments decrease the overall amount of visual light transmitted through the lens and significantly reduce the clarity with which the human eye may see. Lenses are still waiting for improvement.

The problem with prior art approaches is that they also significantly block many of the visible light wavelengths, lowering the visible light transmission (VLT) through the lens or panel and adversely impacts the visual acuity of the wearer.

Eyeglasses of broad bandwidth have non-selective filter lenses that reflect light in a scattered manner.

These broad wavelength shields impose severe limitations on the visibility of the wearer, even in broad daylight. This problem becomes further pronounced as available light levels in the ambient environment are decreased. The reduction in available visible light significantly impacts the wearer's ability to carry out certain functions, impairs their depth perception, and impairs their ability to perceive certain colors.

Another alternative to manufacturing a protective filter or lens was to provide a coating on the outer surface of a lens after it was formed. Such a coating process dramatically increases the cost of the lenses while the absorbed selective dye makes the coating too thin to be effective. Thickening the coating may result in an uneven layer and cracking.

UV radiation, we need to take special care to protect human eyes. Even on cloudy days we should wear sunglasses to reduce the ultraviolet radiation reaching our eyes. UV radiation is invisible to us and is composed of 3 main wavelengths: UVA, UVB and UVC. UVB rays are mostly absorbed by the cornea (the outermost layer on the front of the eye) and therefore do not penetrate through to the retina, unlike UVA radiation, which passes through the cornea to the lens and retina of the eye. UVC radiation is filtered out by the Earth's atmosphere. Table 1 below shows the 3 main components of the UV spectrum.

TABLE 1

| | | Ultraviolet Spectrum | | |
|---|---|---|---|---|
| Name | Abbreviation | Wavelength (nm) | Photon energy (eV, aJ) | Notes/alternative names |
| Ultraviolet A | UVA | 315-400 | 3.10-3.94 (0.497-0.631) | Long-wave, black light, not absorbed by the ozone layer: soft UV |
| Ultraviolet B | UVB | 280-315 | 3.94-4.43 (0.631-0.710) | Medium-wave, mostly absorbed by the ozone layer: intermediate UV |
| Ultraviolet C | UVC | 100-280 | 4.43-12.4 (0.710-1.987) | Short-wave, germicidal, completely absorbed by the ozone layer and atmosphere: hard UV |

(UV dye) Ultraviolet (UV) and Visible (Vis) dyes may be incorporated into coatings, solutions, and plastics. It is important to block UV (A) 315-400 nm because these radiations reach Earth. The current technologies of UV protection are very sophisticated. It has been 40 years, and it is easy to apply it to lenses. Of course, the right UV powder and good processes are necessary for lenses that can effectively block UV light. Region Blue light, which has a shorter radiation wave, and blue and purple photons, however, have shorter wavelengths, which allow molecules to easily absorb them. The molecules hold onto the photon for only an instant, then shoot them out again in a random direction. This is why the sky looks blue. Many of these scattered photons fly toward the Earth, making the sky appear to glow. They can also cause damage to the human eye.

Blue light comes from both natural sources (sunlight) and artificial sources (screens, LED lights, appliances, etc.). Blue light exposure may lead to eyestrain and fatigue and may trigger a series of chemical reactions that cause irreversible degenerative damage to photo-receptor cells in the retina.

400-455 nm blue light, which emits more neon violet blue scatters easily, leading to greater visual fatigue and blurry vision. The plurality of organic dyes includes blue-absorbing organic dye, which has a blue light absorptance peak until 400-455 nm. For special needs where it is necessary to block 400-495 nm blue light for special work, visual needs, or preferences of a person, it is possible to add additional dye powder.

In some instances, blue light may have serious and damaging effects on the human eye. Blue light wavelengths transmit from 400 nm to 480 nm, with the light from 400 nm to 455 nm being the most harmful, especially 410-430 nm because near-purple blue light contains little neon ultraviolet radiation with faster and shorter wavelengths, affecting the eyes to a greater extent. With recent technological evolution, the human eye is exposed to an increased amount of blue light throughout the day, and we need protection from this light spectrum.

The technology that is well-known for the anti-blue light 400-455 nm is wide bandwidth technology, such as dyeing, dipping, injection, extrusion, film coating, and coating. The wide bandwidth is not sharp enough, which will affect the color. Hue value and saturation will also increase dimness.

The wavelength frequency range for indigo is around 425-450 nm with a frequency of 670-700 terahertz (THz). Indigo may be considered a subset of the violet color. The low range of the color explains why it is difficult to distinguish this color in the spectral band. Since indigo is scientifically not recognized as a separate color, any wave having a wavelength of less than 450 nm is considered to be violet.

Some embodiments may provide for region enhanced contrast. The sun's maximum emission is around 580 nm, therefore there may be a benefit to blocking the radiation at 580 nm. One embodiment of the disclosure may include a new, high-contrast method providing anti-blue light lenses making it easier for people to see clearly, effortlessly, fast, and far.

If the frame is the skeleton of the glasses, the lenses are the soul of the glasses; the quality of lenses may determine the future of human eyes! Therefore, as an important line of defense for eye protection, three major potential factors that may damage human eyes in natural light must be considered: ultraviolet, blue, and near-IR.

Region IR Near-IR Exposure and Cataracts: one of the most common eye diseases associated with near-IR radiation is cataracts. Prolonged exposure to IR radiation causes a gradual but irreversible opacity of the lens. Another form of damage to the eye from IR exposure includes stoma, which is a loss of vision due to the damage to the retina. Even low-level IR absorption may cause symptoms such as redness of the eye, swelling, or hemorrhaging. IR rays penetrate clouds more strongly than visible light, so its penetration rate is relatively higher, causing relatively large damage to the eyes. Cataracts caused by near-IR radiation have been noted historically in glassblowers and furnace workers. Radiation between 800 and 1,200 nm is most likely responsible for temperature increases in the lens itself because of its spectral-absorption characteristics. Visible wavelengths may also contribute to the problem since the heat absorbed by the iris could result in heat transfer to the lens.

Coating methods with inorganic absorptance of IR may include dye liquid dipping. This method may not be good enough to absorb the N-IR spectrum radiation ray region, and viewers wearing these glasses may see a deterioration in clarity.

When absorbed, IR radiation causes a rise in temperature. IR light is also beyond the detection of the human eye. It may be important to recognize that light radiation acts as a catalyst in the oxidation of materials—particularly organic artifacts. The eyes are particularly sensitive to thermal effects. Suitable protective goggles may protect the eyes against excessive exposure to IR radiation. The biological effects of IR are mainly thermal effects. IR is easily absorbed by dark objects. High-intensity IR causes tissue necrosis and protein coagulation. Far-IR rays may penetrate only 0.5 cm to the left of the tissue and are almost completely absorbed by the cornea and aqueous humor. Near-IR rays may penetrate the tissues by 3 cm to reach the retina and are absorbed by pigments in the iris and retina.

Glass material for glass lenses may have a slightly anti-IR function. It takes temperatures of over 800 degrees C. to melt and mix the glass with rare earth IR absorptance dye. If damaged, the dye may only absorb radiations with wavelength of 750 nm, 810 nm, or 890 nm. Lenses may be made using injection or extrusion, but the processes may require temperatures to be over 230 degrees C., which can melt polymer plastic, damage the dye structure, and decrease color. Moreover, the lenses may need to have a thickness of at least 0.4 mm, and because the dye is sprayed out on a thicker plastic, the absorptance dye becomes less concentrated, and the lenses' function deteriorates. In order to maintain the lens functional requirements and the requirement that haze (percent of scattered incident light through a lens) should not exceed 1.0, the cast film may be used with injections or cast substrates, and appropriate material selection and technology, such as cost considerations, demand, or high impact resistance, may be very important.

IR ray is an invisible electromagnetic wave transmitted by the sun. Ultraviolet, visible, and IR electromagnetic waves with wavelengths of 280-10000 nm will interfere with various electromagnetic waves, especially IR waves between 800-1200 nm, so implementing the best methods to protect human eyes is vital. Because IR-absorbing lenses are not easy to obtain, there is not much information about them. Moreover, research is difficult, and infrared-absorbing dye materials are expensive. Although there are some products on the market, they don't have good functions. Considering that the above-mentioned potential sunlight or artificial light source may effectively block harmful light waves, the present application can enact many improvements to sunglasses lenses, optical sun prescription lenses, and optical sheets.

Embodiments for: Eyeglass Lens, Goggle Lens, Shield, or Sheets

Embodiments for eyeglass lens, goggle lens, shield, or sheets are provided. The embodiments may contain organic dye (visible narrow band absorber) film wherein the narrow band-width wavelength attenuation (absorbed) of unwanted radiation light is selective, especially in regards to low haze, Clarity, or/and colorful enhance contrast.

And at least add an organic, absorbed IR dye protection layer, which reduces eye strain, increases visual comfort, and improves the vividness of a scene in high definition color.

The lens contains either a casting function film or a plurality of casting function film and laminated film on its convex, or (in other words) 0.0-1.5 mm deep into the surface of the lens, with or without grinding, and without damaging the function film, and the total thickness of the lens is 0.2-10.0 mm. With an IR thin film, either an extra 0.02-0.18 mm is added onto the convex or the film is embedded 0.0-1.5 mm into the surface, with or without grinding, and without damaging the function film, and the total thickness of the lens is 0.2-10.0 mm. Application is a method of manufacture.

Dyes having a full width at half maximum (FWHM) at 10-80 nm are generally not easy to dissolve in organic solvents. One of the only solvents that may be dissolved is less than 0.1%-0.2% of the mixture, and the coating with a recommended general solvent. The thickness is about 0.05-0.08 mm. When the dye content is too low, it may make it impossible to achieve the desired effect. If a solvent with too strong of a dissolving power is used, the coating mixture and the coating substrate will be damaged by the strong solvent. However, for solution casting films, using parts of strong solvent soluble dyes and polymers may be preferred. When selecting solution casting to make a film, the film may be 5 to 30 times thicker, meaning that the dye content is also increased by 5 to 30 times, and the strong solvent may also increase the amount of dissolving power by 3 to 15 times depending on the dyes.

The 400-455 nm area is more than 8% lower than the 480-550 nm area. Special demand 440-490 nm is below 5% in the 400-440 nm region. Enhance contrast may choose the suitable dye in the 570-595 nm.

The NIR organic dye is selected from 700-1200 nm, and it is still waiting for 1200-2000 nm organic IR dye to be added to the lens.

Important Application Element

1. FWHM—One lens contains at least one or more soluble function dye FWHM in absorbance 10-50 nm (visible narrow band absorber) with polymer. Haze should be under 1.0.

2. A solution casting function film lens contains either a solution casting function film or a plurality of a solution casting function film and a laminated film on convex or (in other words) on top of the lens.

3. Functional layer on convex or (in other words) 0.0-1.5 mm deep into the surface of the lens by grinding and without damaging those functional films without grinding or with grinding but without damaging those functional films, the lens total thickness is 0.2-10.0 mm.

4. High contrast or enhanced contrast, the application increases the contrast, focusing on radiation wavelengths absorbed between (C) 570-590 nm, helping the human eye to better distinguish objects, and expanding the vividness of a scene in high definition color.

5. Laminated absorbed IR radiation thin film. Benefits may include being easy to operate, easy to apply, easy to store functional film with less variety film, easy preparation of raw materials, reduced layer membrane, and reduced separation risk. Another benefit may include increased yield. Another benefit may include reducing one layer of processing cost, and good quality.

The functional film is concentrated in the upper half of the outer contour. The function is concentrated. The functional color mode of the Semi Rx Lens greatly reduces the proportion that is cut to, the function is more average, and the color is relatively flat.

Solution casting film, injection molding, gasket casting, and lamination are different processes that can be selected alone or combined. The function may be to protect layer barrier, the same or similar or different functional layer may be overlapped and if necessary, which may achieve a penetration of absorbed, transmission 0.001% or higher, 0.0001% or even higher, 0.00001%.

Function dye may mix together or separately on one film, and the film material may vary.

At least one solution casting film is laminated, co-injected, or co-casted into a lens, shield, or sheet.

Or a combination of lens components.

Attenuate selective wavelength regions. These (AB)UV dye-VIS dyes may be used singly or in combinations to create custom spectral filters for multiple applications. UV dye most easily combines with most dye mixes used too.

Filter out the highest energy wavelengths of (B) 420-455 nm. 400-420 nm when (A) UV 400 dye absorbs a part of it, 420-455 nm becomes very important, but it is easy to absorb the dyes in this area to disturb other colors areas, so the right method of solution casting needs to be used, or some layer use injection, casting, and the right dye, as using narrow bandwidth (FWHM) 40 nm dyes. Mix with one or more different function dye.

(C)—The present application is to solve the sun's maximum emission, which is around 580 nm, problem of reduced visual acuity when wearing protective eyeglasses of lenses. The application increases the contrast, focusing on radiation wavelengths absorbed between (C) 570-590 nm and therefore helping the human eye to better distinguish objects. An eyeglass lens with high-contrast or medium contrast enhancement provides better transmission values in the red and green visible spectral range.

Regular (broad) coloring dye for (B) 400-760 nm absorbs visible dye and may be selected for use. Some necessary adjustments may be to sharpen the color and allow lenses to darken.

The new high-contrast, medium contrast, or few contrast method added to the anti-blue light lens, or say blue blocker lens, makes it easy for people to see clearly, effortlessly, in detail, fast, and far. Visible radiation rays can be filtered by attenuating a portion of the light transmitted by the lens within one or more of the filtered portions of the visible radiation rays. An optical filter may include means configured to increase the average saturation value of a narrow notch of 40 nm+−30 nm bandwidth having uniform intensity with light emissions transmitted at least partially through a portion of the lens.

In combination with other dyes selectively transmits predetermined primary color wavelengths.

A suitable mixture of two or more dyes may be a requirement for absorbing 400-470 nm.

New lens with multi-function performance, a lighter color for indoors, rain, or early mornings, and a darker color for sunny days and outdoors.

(D) Absorptance Near-IR Function.

Organic IR dyes absorb 760-1100 nm of near-IR radiation ray. The function was more efficient than inorganic IR dyes. Inorganic IR dye contains haze, is a particle, and cannot be used at too high of a percentage or clarity may be deteriorated.

Newly developed IR absorptance dyes have higher transparency in the visible light region compared to conventional products.

Organic IR dyes in the status quo are very good for NIR 700-1400 nm, while it needs to be mixed with inorganic IR dye for over 1400 nm.

High temperature glass lenses melt with IR dye. For absorbance at 760-1400 nm, it may only absorb peaks at the 750 nm, 810 nm, and 890 nm parts of radiation, 760-1400 nm organic NIR dye clarity, high performance absorptance, clarity, comfort, HAZE, of quality was on medium range.

A suitable mixture of two or more dyes may be necessary for absorbing 400-470 nm. The right method of solution casting, injection, or casting and the use of the right dyes by using narrow bandwidth (FWHM) 40 nm dyes. Mix with one or more dyes.

Lens at (D) the 760-1100 nm portion absorbed 38% and up, and the same lens at 1100-2000 nm absorbed 20% and up.

1. One lens contains at least a function film (B) blue blocker film with (D) NIR absorptance film laminated or (B) & (D) dye mix in one film. Add with or without coloring dye, if necessary, layer or layers & any kind of process.
2. One lens contains at least a function film (B) blue blocker film with (C) enhance contrast film laminated or (B) & (C) dye mix in one film. Add with or without coloring dye, if necessary, layer or layers & any kind of process.
3. One lens contains at least a function film (B) blue blocker film with (C) enhance contrast film with (D) NIR absorptance film laminated, or any one of those dye combination films. Add with or without coloring dye.
4. One lens contains at least a function film with (C) enhance contrast film (D) NIR absorptance film laminated, add with or without coloring dye.
5. For special needs, it is necessary to be protected from (B) blue light 400-495 nm, and one or more additional functional dyes or regular coloring (broad) dye, and combine with/without any function dye (C) enhance contrast (D) NIR absorptance film.
6. Different dyes may be combined on the same film.
7. Functional film with co-injection substrate.
8. Above may be added with our without (A) UV powder dye, or may be comprised with/without polarization.

Steps of Making Methods: Example

A. A lens comprising of: a polymer material; and at least two filters incorporated into the polymer material of said lens, said two filters combining to block most (A) UV light and selectively filter blue and violet light pursuant to a sharp cut-on filter that substantially blocks wavelengths shorter than 400 nm-455 nm. (film)

Wherein the plurality of organic dyes includes blue-absorbing, organic dye, which have a blue light absorptance peak centered wavelength until 400 nm-455 nm AB, —filter out the highest energy wavelengths of (B) 420-455 nm. 400-420 when UV 400 dye will absorb a part of it, 420-455 nm becomes very important, but it is easy to absorb the dyes in this area to disturb other color Areas, so it is necessary to use the right method of solution casting, injection, or casting and the right dye by using narrow bandwidth (FWHM) 40 nm dyes. Mix with one or more dye. (film laminated or mix injection layer process)

The requirement of absorbing 400-470 nm may also decide the suitable mixture of two or more dye.

B. A Blue blocker narrow bandwidth dye polymer film with selective narrow bandwidth wavelength attenuation (absorbed) of unwanted radiation light at around 400-430 nm with absorption of over 80-99%, or at around 430-455 nm with absorption of around 85-95%. The blue blocker functional film may be included on the top side of a lens part with the functional film being around 0-0.7 mm without grinding. In some cases where a prescription is desired (semi Rx) a thicker optical lens with grinding may be desired with the total lens thickness being around 0.05-8.0 mm.

C. A High contrast, or enhanced contrast, functional polymer film comprised of organic dye, absorbing selective narrow band-width wavelength attenuation (Absorbed) of unwanted radiation light 570-590 nm over 20%, High contrast, or enhance contrast of Functional polymer film on lens part of top side 0-0.7 mm without grinding or semi Rx thicker optical lens with grinding but not reaching the functional film surface, total lens thickness 0.05-8.0 mm.

D. Functional polymer film comprised of IR organic dye selective narrow band-width wavelength attenuation (Absorbed) of unwanted radiation light 800-1200 nm absorbed over 60%, IR functional film on the lens part of the top side 0-0.7 mm without grinding or semi Rx thicker optical lens with grinding but not reach function film surface, Total lens thickness 0.05-8.0 mm.

B+C+D FWHM

The present application describes eyeglass lens products consisting of a multilayer wafer that may or may not contain injection-molded thermo plastic, or thermosetting plastic inner portion. The multilayer wafer blue blocker, enhance contrast. IR absorbed layer. The application further describes a method for obtaining a multilayer wafer. Full-width half max value of less than 80 nm-10 nm, high optical density filtering characteristics across a narrowly selected infra-red wavelength range of between about 750 nm-1400 nm.

OPTION 1: Photochromic.

Photochromic dye mix into polyurethane (PU) glue with laminated between polymer films.

Example 1

A paint containing a tetraazaporphyrin compound as a functional dye was mixed and prepared at the following mixing ratio and was then coated on the surface of the inner side glass lens by a spin coating method.

(1) 100.0 parts by mass of acrylic polyol (manufactured by Rock Paint Co., Ltd.: Hyper Clear) containing 4-hydroxybutyl acrylate (2) 33.3 parts by mass of polyisocyanate (3) 16.7 parts by mass of cyclohexane (4) Tetraazaporphyrin compound (manufactured by Yamada Chemical Industry Co., Ltd.: TAP-2) 0.8 parts by mass (5) Silane coupling agent (manufactured by Chisso: Thyra Ace) 0.7 parts by mass OPTION 2: Glue Adhesive Optical adhesives are used to bond or cement optical components together or to an optical system for a number of optical applications. Optical Adhesives may be used with curing lamps to ease or quicken the adhesion process. Optical Adhesives allow precise positioning of optical components within a system by affixing components firmly in desired locations or positions. Optical Adhesives reduce the need for purchasing additional components by allowing existing components to be combined or positioned manually.

Optical Adhesives:

Optical adhesives are used to bond or cement optical components together or to an optical system for a number of optical applications. Optical adhesives may be used with curing lamps to ease or quicken the adhesion process. Optical adhesives allow precise positioning of optical components within a system by affixing components firmly in desired locations or positions. Optical adhesives reduce the need for purchasing additional components by allowing existing components to be combined or positioned manually.

A 100% solids epoxy system, which is used as a structural adhesive or Type EK-93 sealant.

Gluing is an essential technological process in many industrial technologies. The state-of-the-art adhesives are especially designed to meet the wide range of applications while being highly specialized. They simplify bonding processes, guaranteeing high processing speed combined with high reliability.

OPTION 3: Coating

Coating methods: screen, spray, floating, roller print, dipping, slot die nozzle coating OPTION 4: Dye A. UV Dye Epolin

QCR

Exicton

B. Blue Blocker Dye benzoxazolium iodide iodide indolium chloride benzo[e]indolium hexafluorophosphate benzo[e]indolium 4-methylbenzenesulfonate indolium chloride indolium tetrafluoroborate indolium perchlorate methylbenzenesulfonate indolium bistrifluoromethanesulfonimidate tetrahydropyrimidin-4-olate & select from Epolin QCR exciton C. High Contrast Dye for Choice to Apply Yamada Epolin Exiction D. IR Dye for Choice to Apply Epolin

QCR

Some example IR oil-based soluted dyes may include tetrakis ammonium structure, naphthalocyanines, metal complexes, azo dyes, anthraquinones, quadratic acid derivatives, immonium dyes, perylenes dianthrones cyanines heteroaromatics metal dithiolenes oxadiazoles phthalocyanines spiropyra tetraaryldiamines triarylamines; diimmonium; polymethine-based dye; squarylium-based; indoaniline; sub-ammonium based pigment; anionic compound; scare morpholino dyes; inorganic oxide.

E. Water Soluble Dye for Choice to Apply

QCR

FEW

Some example dyes may include hydroxide, inner salt, sodium salt, benzoxazolium hydroxide, inner salt, sodium salt, indolium hydroxide, inner salt, sodium salt, triethylammonium salt, ium hydroxide, inner salt, triethylammonium salt, indolium hydroxide, inner salt, sodium salt, indolium hydroxide, inner salt, trisodium salt, benzo[e]indolium hydroxide, inner salt, triethylammonium salt, benzo[e]indolium hydroxide, inner salt, trisodium salt.

Other examples may include C38 H46 Cl N2 O6 S2 Na, C43 H47 N2 O6 S2 Na, C44 H52 N3 O6 S3 Na, C38 H49 N3 O6 S4 Cl, C46 H51 N2 O6 S2 Cl, C52 H56 N3 O6 S3 Na, C20H26O5, C20H18, N403, C24H29N3O7, C32H4BrN2O2, C36H44BrN3O4, C33H42N2O5S, C43H53N3O7S, water soluble cyanine dye, and inorganic dye, and powder dye.

F. Laser Dye for Choice to Apply

| Epolin laser dye list | | |
|---|---|---|
| Laser | Epolight ™ | Lens Color |
| Argon | 7689 | red-orange |
| 488 nm Alignment | 7686 | red-orange |
| 532 nm alignment | 7687 | red-orange |
| Helium Neon (594.1) | 7688 | blue |
| Helium Neon (632.8) | 7578 | blue |
| Ruby | 7655 | blue |
| Alexandrite | 7567 | pink |
| 800/810 Femto second | 7691 | pink |
| YAG | 7568 | green |
| High power YAG | 7665 | green |
| Broadband laser | 7684 | green |
| Telecom | 7690 | green |
| 2 line YAG and KTP | 7657 | orange |

G. Photochromic Dyes for Choice to Apply

Exemplary photochromic dyes include, but are not limited to, triarylmethanes, stilbenes, azastilbenes, nitrones, fulgides, spiropyrans, naphthopyrans, Spiro-oxazines, quinones and the like.

Option 5: Polymer for Choice to Apply

Water Soluble

PVA, PVB

May include dimethylsulfoxide (DMSO), glycerol, styrene-acrylic, pure acrylic emulsion, a rosin plastic sizing agent, or other additives to help the solution easier form as desired film.

Solvent Soluble for Choice to Apply:

PETG Easter Man

Other example polymer may include TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride, Polyox, Nylon, property modified Nylon.

Option 6: Organic Solvent (Oil Base) for Choice to Apply 1,3-dioxolane; Chlorobenzene; Benzene chloride; monochlorobenzene; 5-chlorobenzotriazole; 5-chloro-1; 5 Chemicalbook-chlorobenzo Triazole; 6-chloro-1H-benzotriazole; solvent chlorinated hydrocarbons; Glacial acetic acid dimethylacetamide chloroform tetrachloromethane carbon tetrachloride monochloromethane, trichloroethylene; triphenyl phosphate, diphenyl phosphate, methanol, resorcinol, tetraphenyl diphosphate, acetone, butanol, butyl acetate, butanol, biphenyl diphenyl phosphate, trichloromethane, MEK, EAC, IPA, MIBK, BCS, MCS, EAC, BAC, cyclohexanone, tetrahydrofuran, ether, esters, polyimides, dimethylformamide, polyvinylalcohol, methyl cellulose, starch derivatives, gelatine, methyl-ethylketon, tetrahydrofuran, and methylene chloride.

Option 6-1: Water Solvent for Choice to Apply

Water or Mix with Alcohol Methanol Ethanol

In some embodiments, the various options, methods, processes, etc. may be used to create suitable glass (e.g., using films or injection molding or any other suitable processes) with desired light transmission properties. Combinations of injection molding and/or solution casting may be used for the glass (e.g., eyeglasses). In one embodiment, combinations of dyes that absorb or block light in the visible range may be used. Dyes that absorb or block light in the infrared range may also be used. Other dyes having properties in various wavelengths of the full light spectrum may also be used based on user preferences and design. The various combinations of films and/or injection molded materials may provide benefits for manufacturing and the end user. Some example benefits include speed, efficiency, configurability of the manufacturing process and end results.

In an example, dyes associated with prominent sunlight ranges (e.g., on the terrestrial surface) such as the blue-light range (around 400 nm), solar peaks at around 580 nm, and the infrared range may be combined for beneficial use for glass films. It will be appreciated by those skilled in the art that any combination of dyes associated with the various light spectrum ranges may be used.

Some example combinations are shown below in TABLE 2. The type of dye is listed on the first row. EM1, EM2, EM3, EM4, EM5, EM6, EM7 are the example embodiments with the possible type of process used for each dye. For example, embodiment 1 (EM1) may include a 400 nm dye and 580 nm dye injection molded onto a substrate, with an IR dye deposited on a film (e.g., laminated on a film). The film may be combined with the substrate including the 400 nm and 580 nm dyes. In other embodiments, each dye may be deposited on its own separate substrate with the substrates later combined. In other embodiments each dye may be deposited via casting onto its own film substrate. In this manner, one or more dyes may be included on a substrate with one or more substrates combined; similarly, one or dyes may be included on any combination of one or more films. The films, castings, and substrates may be combined in any operative order.

EM2-EM4 show the other example combinations of injection molding and film combinations. The examples of TABLE 2 are merely illustrative, and one skilled in the art will recognize that any combination of dyes may be used in any combination of depositing the dye onto a substrate (film, glass, etc.). One skilled in the art will recognize that any number of layers and any number of dyes may be used.

TABLE 2

Example embodiments with combinations of dyes

| DYE | 400 nm | 580 nm | IR |
|---|---|---|---|
| EMI | Injection | Injection | Film |
| EM2 | Film | Injection | Film |
| EM3 | Injection | Film | Film |
| EM4 | Film | Film | Film |
| EM5 | Casting | Film | Film |
| EM6 | Film | Casting | Film |
| EM7 | Casting | Casting | Film |

In some examples, UV dyes may be combined. In other examples, UV dyes may be omitted. Any of the methods for deposing the dyes on films may be used, including dyeing, dipping, injection, extrusion, film coating, coating, etc.

FIGS. 7A-L show some example spectrometer charts using various example dye combinations. The results may be produced by the solution casting method, although it will be appreciated that other methods may be used. Unless otherwise indicated, the charts may use a Y-axis with "% T" or percent transmission of light; the X-axis may represent light wavelength in nanometers.

Figure 7A:
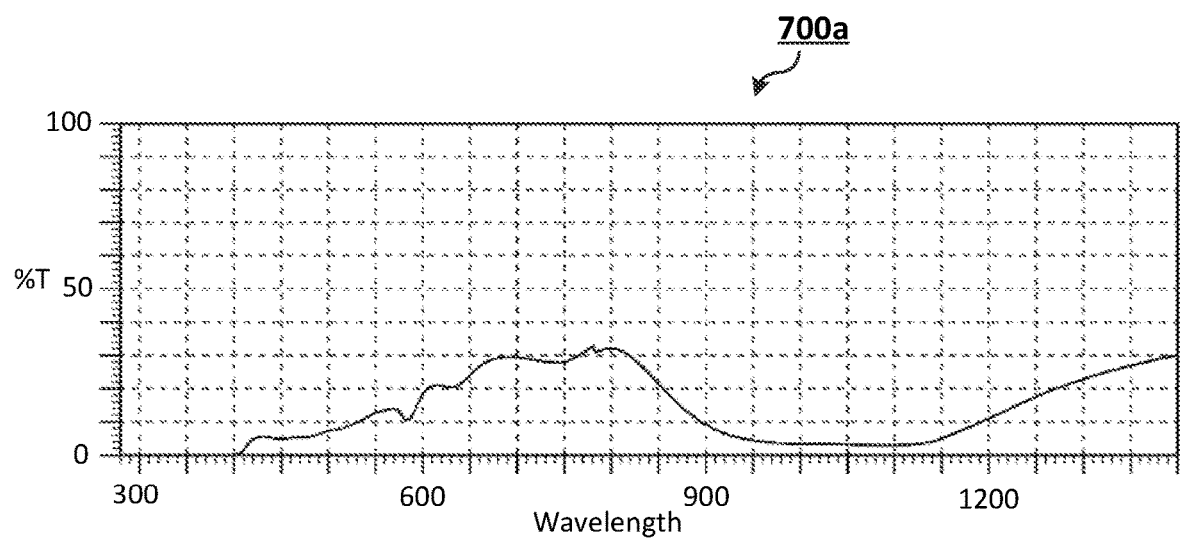
FIGS. 7A-L show some example spectrometer charts using various example dye combinations.

FIG. 7A illustrates a spectrometer output 700a when using a blue dye (blue blocker) with properties of near-infrared absorbance with a contrast-enhancing dye. The spectrometer output shows a little or zero transmission in the UV range with peaks in the visible spectrum and trough in the near-infrared range.

Figure 7B:
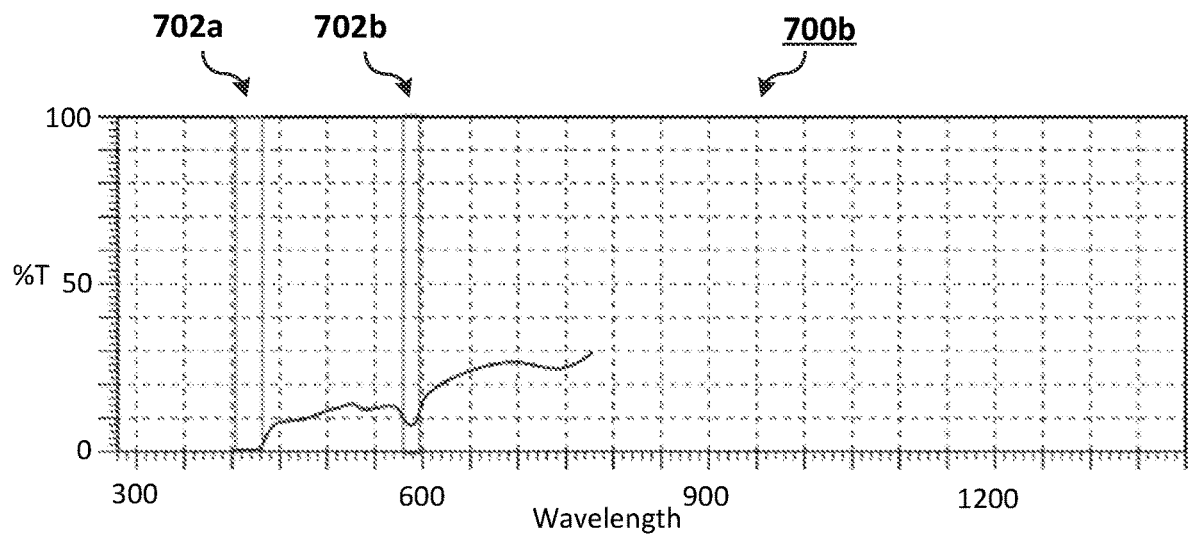

FIG. 7B illustrates another spectrometer output 700b for a film using a blue dye (blue blocker) with a contrast-enhancing dye. The spectrometer output shows a little or zero transmission in the blue light range around 400-430 nm with a trough band (approximately plus/minus 15 nm) around 580 nm. Other examples that may provide similar results may include organic dyes that absorb NIR radiation or adding a co-injection or gasket casting substrate mix containing a blue blocker dye and a contrast-enhancing dye.

Figure 7C:
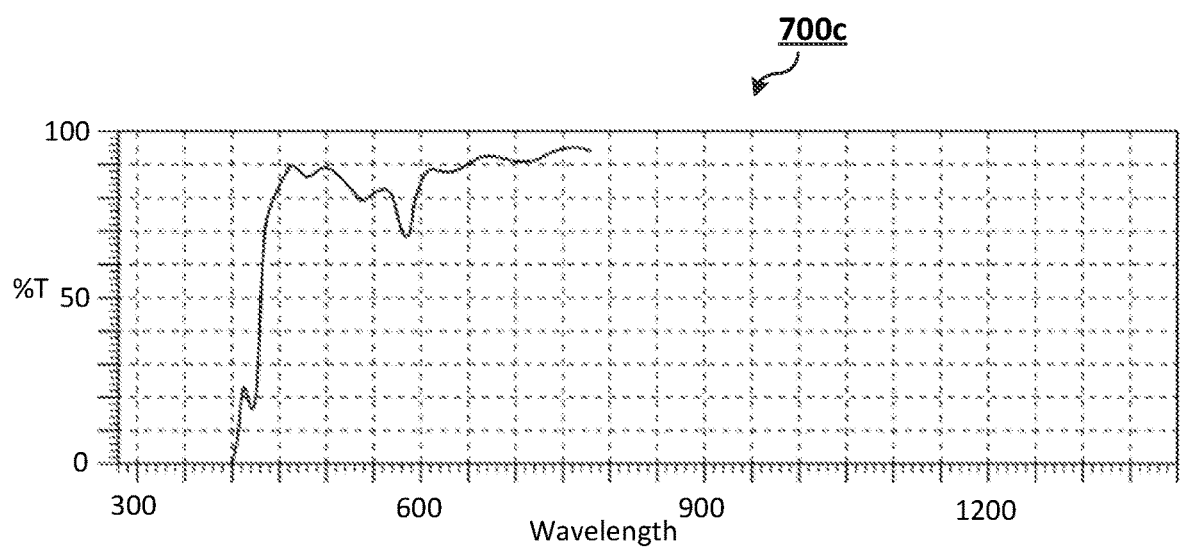

FIG. 7C illustrates another spectrometer output 700c when using at least two functional dyes effective in the 420-700 nm range. The spectrometer output shows a sharp rise around 400 nm with a slight trough around 570 nm.

Figure 7D:
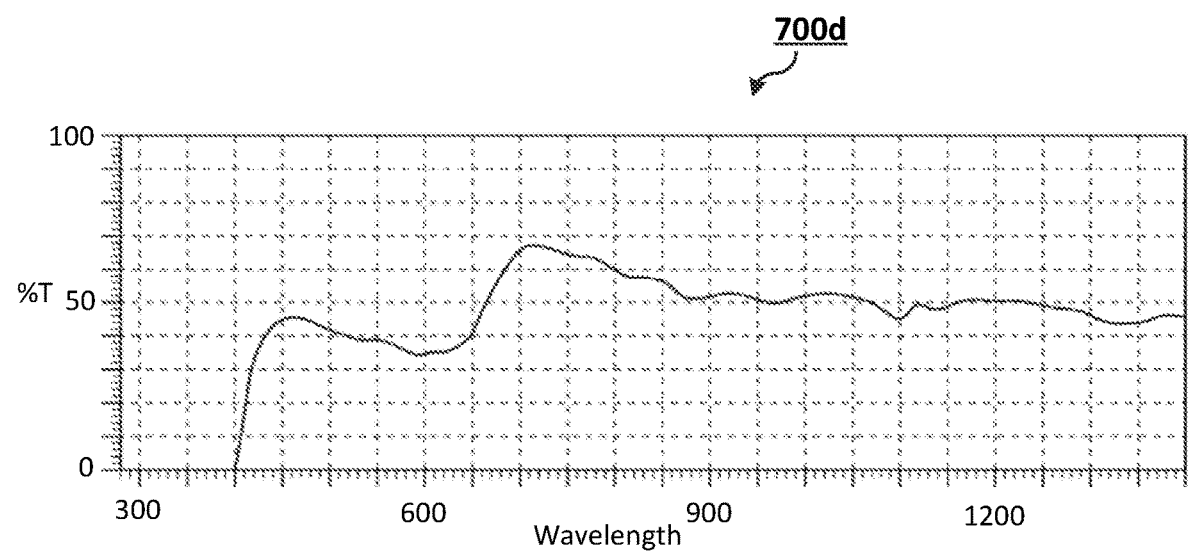

FIG. 7D illustrates another spectrometer output 700d when a liquid coating technique including an inorganic dye. The spectrometer output shows that the dye may absorb less NIR radiation and produce higher levels of haze.

Figure 7E:
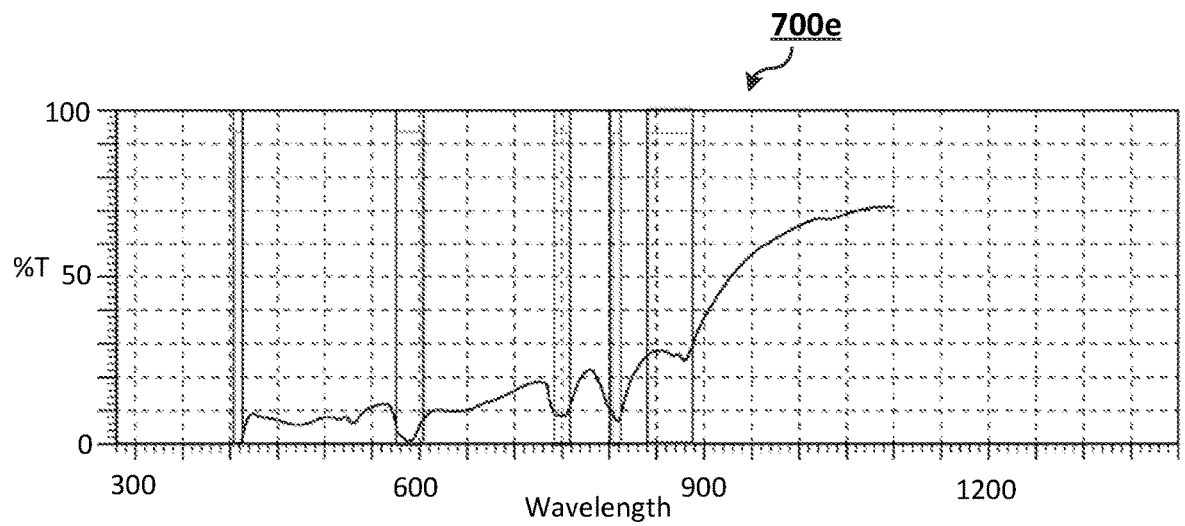
Figure 7F:
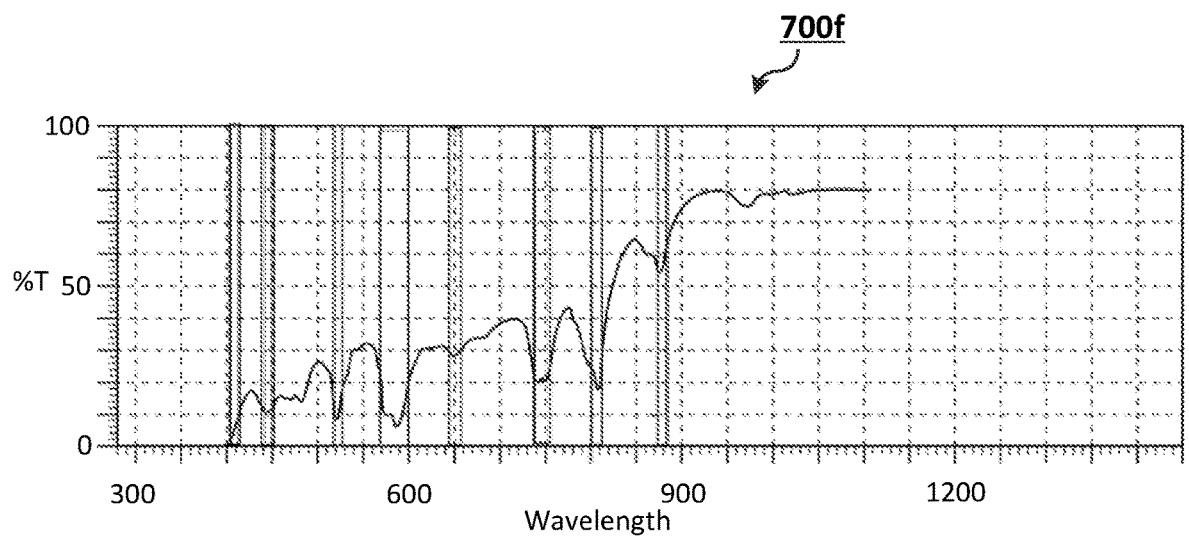

FIGS. 7E-F illustrate other spectrometer outputs 700e-f when using higher temperature above 800 degrees to melt the dye mixture. The results show that the higher temperatures used do not produce an outcome that absorbs more NIR radiation in the 760-1400 nm range.

Figure 7G:
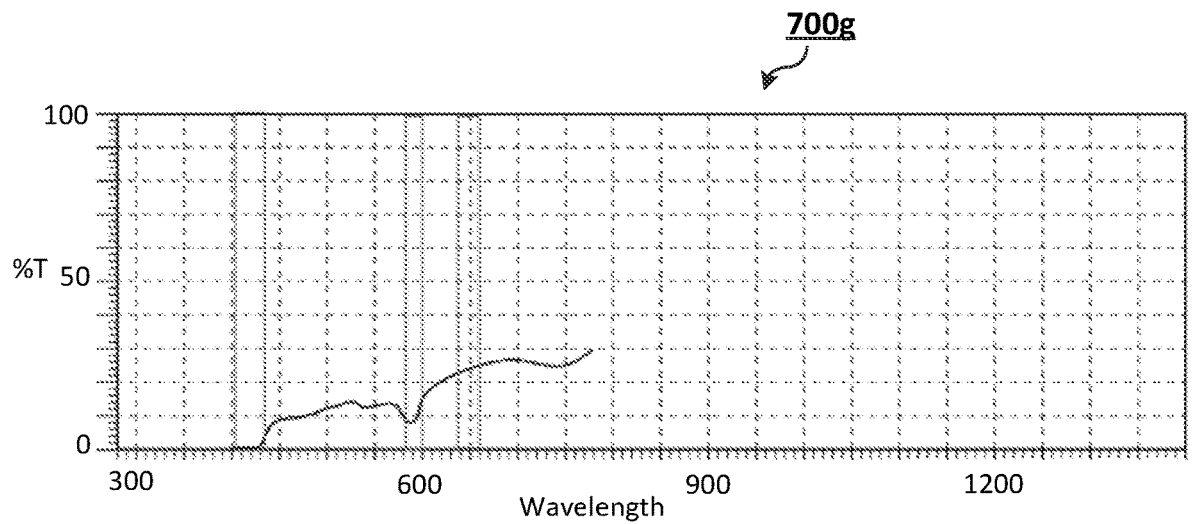

FIG. 7G illustrates another spectrometer output 700g when creating a film containing a blue blocker effective for 400-430 nm with a contrast-enhancing dye effective in the 580 nm range (+/−15 nm).

Figure 7H:
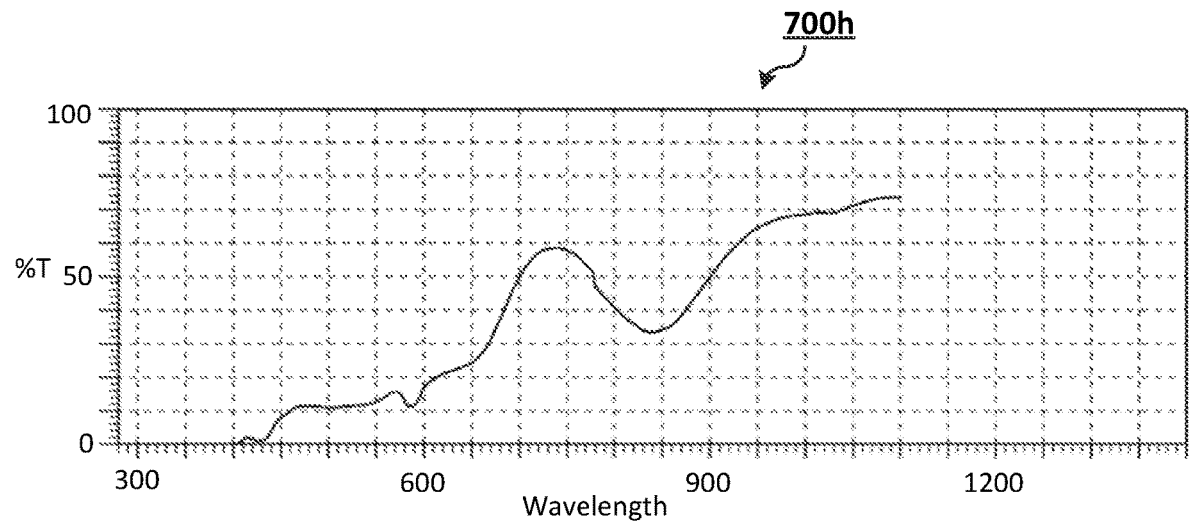

FIG. 7H illustrates another spectrometer output 700h when creating lens by injection molding using two or more functional narrow-band dyes with organic NIR material. The output shows higher transmission around 700 nm with attenuation at the edges.

Figure 7I:
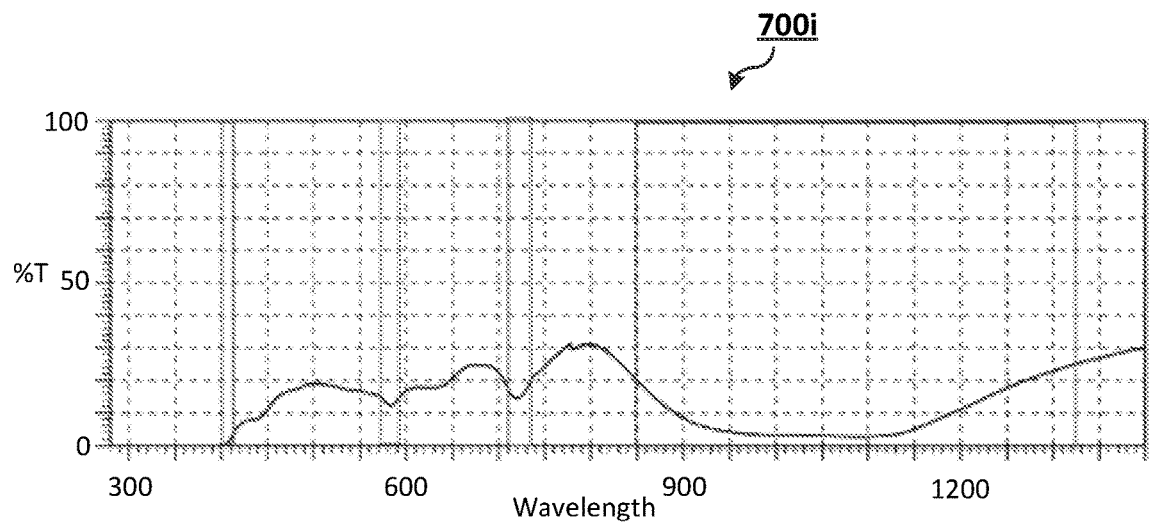

FIG. 7I illustrates another spectrometer output 700i produced using a combination of solution casting (to a film) and injection molding of plastic. In this example, film including 0.5% of an organic NIR dye; the plastic includes 0.05% of a blue blocker dye effective for 400-455 nm along with 0.03% of a contrast-enhancing dye effective in the 570 nm range (+/−15 nm). The result shows favorable output blocking high levels of light (or lower transmission) at around 400 nm, 570 nm, and in the MR range.

Figure 7J:
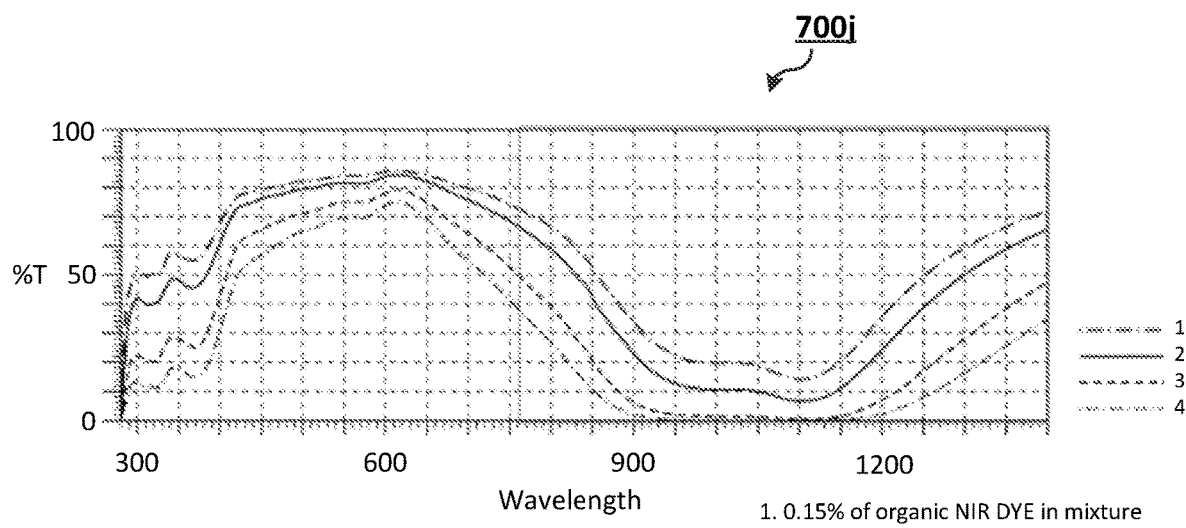

FIG. 7J illustrates another spectrometer output 700j produced using organic NIR dyes at various concentrations at 0.15% ("1"), 0.20% ("2"), 0.42% ("3"), and 0.60% ("4"). The chart shows the lowest concentration ("1") as the top curve having higher transmission (or lowest absorption) across the wavelengths; the chart shows the next lowest concentration ("2") as the second highest curve having higher transmission (or lower absorption) across the wavelengths; the chart shows the next lower concentration ("3") as the second lowest curve having the second lowest transmission across the wavelengths; the chart shows the highest concentration ("4") as the lowest curve having the lowest transmission (or highest absorption) across the wavelengths.

Figure 7K:
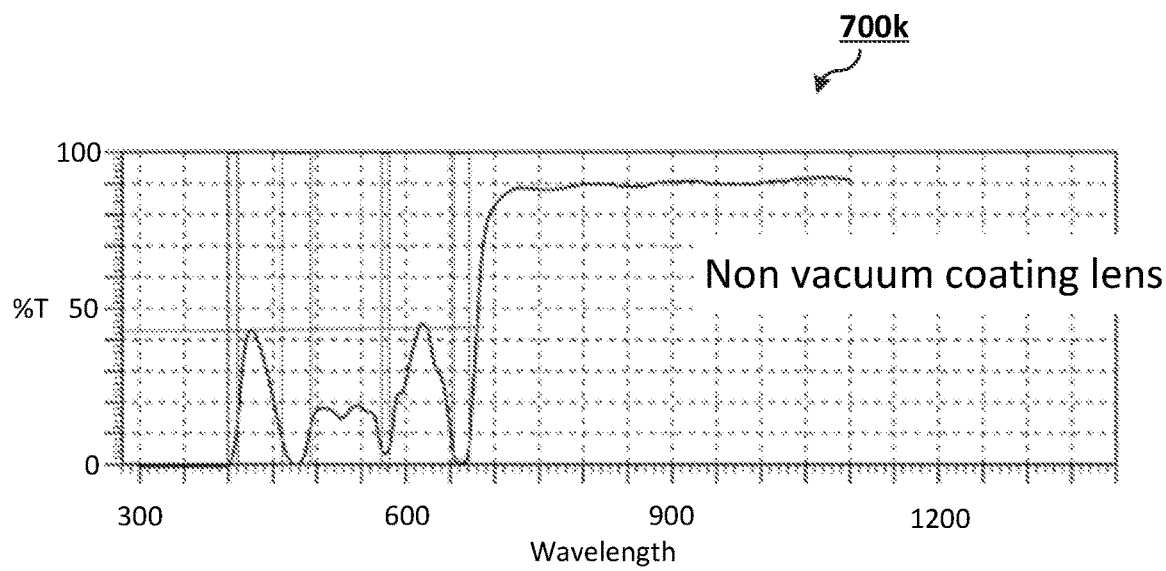
Figure 7L:
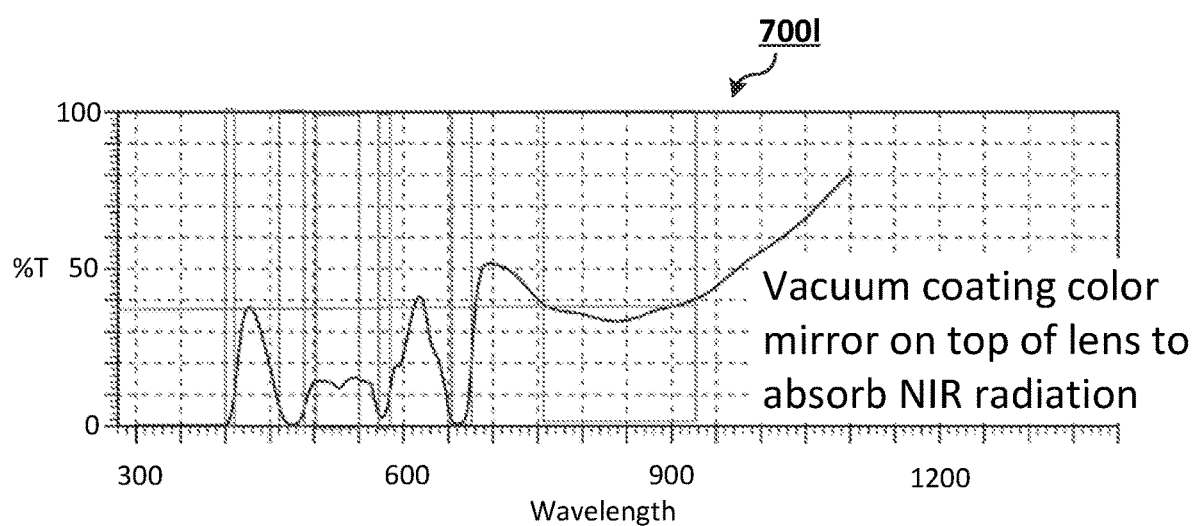

FIGS. 7K-L illustrate other spectrometer outputs 700k-l produced comparing the differences between using a non-vacuum-coating process versus a vacuum-coating process. The results show that the vacuum-coating process produces increased absorption of NIR radiation compared to the non-vacuum-coating process.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method of manufacturing an eyeglass lens, goggle lens, or shield using a solution casting process, the method comprising:
   providing at least three layers comprising an infrared (IR) film layer, a violet-blue light layer, and a green-yellow light layer, wherein the violet-blue light layer and green-yellow light layer are formed by any one of injection molding, film production, or solution casting;
   providing a first soluble polymer solution;
   providing a first dye solution comprising a dye attenuating 760 nm-2000 nm infrared (IR) light with at least 20% absorption, and
   adding the first dye solution to the first soluble polymer solution to form a first dyed solution;
   casting the first dyed solution to form the IR film layer;
   for the violet-blue light layer, one of:
   A) for a film or solution casting process:
      providing a second soluble polymer solution;
      providing a second dye solution comprising at a dye having a property of attenuating 400 nm-455 nm violet-blue light;
      adding the second dye solution to the second soluble polymer solution to form a second dyed solution to form the violet-blue light layer;
      one of: (a) casting the second dyed solution directly onto the film layer to form an at least two-layer film, or (b) casting the second dyed solution to form at least a second film element to further laminate into an at least two-layer film;
   B) for an injection molding process:
      providing a compound for injection molding;
      adding a second dye to the compound, the second dye having a property of attenuating 400 nm-455 nm violet-blue light, and
      injection molding the compound to form the eyeglass lens;
   for the green-yellow light layer, one of:
   A) for providing a film or solution casting process:
      providing a third soluble polymer solution;
      providing a third dye solution comprising at least one a dye having a property of attenuating of 570 nm-595 nm green-yellow light;
      adding the third dye solution to the third soluble polymer solution to form a third dyed solution to form the green-yellow light layer;
      one of: (a) casting the third dyed solution directly onto the IR film or the violet-blue light layer to form an at least two-layer film, or (b) casting the second dyed solution to form at least a second or third film element to further laminate into an at least two-layer film;
   B) for an injection molding process:
      providing another compound for injection molding or using the compound of the violet-blue light layer if available;
      adding a third dye to the compound, the third dye having a property of attenuating 570 nm-595 nm green-yellow light, and
      injection molding the compound to form the eyeglass lens or co-injection molding the compound to form the eyeglass; and
   laminating or casting the at least two-layer film to make the eyeglass lens, goggle lens, or shield or applying the at least one-layer film to an inside of a mold for co-injection molding to manufacture the eyeglass lens, goggle lens, or shield.

2. The method of claim 1, wherein the first dye solution or second dye solution comprises one of a water-based dye or oil-based dye.

3. The method of claim 1, wherein the eyeglass lens comprises one of a glass or polymer material.

4. A method of manufacturing an eyeglass lens, goggle lens, or shield using a solution casting process, the method comprising:
   providing a first soluble polymer solution;
   providing a first dye solution comprising at least one of:
      i) a dye, the dye attenuating narrow-band visible light with a full width at half maximum (FWHM) in absorbance of 10 nm-80 nm or infrared light, wherein the dye has a property of attenuating one of 400 nm-455 nm violet-blue light with at least 70% absorption, 570 nm-595 nm green-yellow light with at least 60% absorption, or 760 nm-2000 nm infrared (IR) light with at least 30% absorption without limitation to FWHM attenuation at 10 nm-80 nm; or ii) a dye, wherein the dye has a property of attenuating one of 400 nm-455 nm violet-blue light with at least 30% absorption, 570 nm-595 nm green-yellow light with at least 20% absorption, or 760 nm-2000 nm infrared (IR) light with at least 20% absorption without limitation to FWHM attenuation at 10 nm-80 nm, and
   adding the first dye solution to the first soluble polymer solution to form a first dyed solution;
   casting the first dyed solution to form a film for laminating onto a surface;
   providing a compound for injection molding;
   adding a second at least one dye to the compound, the second at least one dye having a property of attenuating one of 400 nm-455 nm violet-blue light, 570 nm-595 nm green-yellow light, or 760 nm-2000 nm infrared (IR) light;
   providing a second soluble polymer solution;
   adding a third dye solution to the second soluble polymer solution to form a second dyed solution, the second dyed solution having a property of attenuating one of 400 nm-455 nm violet-blue light, 570 nm-595 nm green-yellow light, or 760 nm-2000 nm infrared (IR) light;
   casting the second dyed solution to form a second film; and
   laminating or casting the laminated first film and second film with an optional one or more additional films to a substrate formed by injection molding the compound to form the eyeglass lens, or applying the laminated first film and second film with the optional one or more additional films to an inside of a mold for co-injection molding using the compound to manufacture the eyeglass lens, goggle lens, shield.

5. The method of claim 4, wherein the first dye solution comprises a third dye having a property of attenuating one of 400 nm-455 nm violet-blue light, 570 nm-595 nm green-yellow light, or 760 nm-2000 nm infrared (IR) light.

6. The method of claim 4, wherein the first dye solution or third dye solution comprises one of a water-based dye or oil-based dye.

7. The method of claim 4, wherein the compound comprises one of a glass or polymer material.

8. The method of claim 1, further comprising providing a dyed adhesive, wherein the laminating or casting the film to the eyeglass lens is based on laminating using the dyed adhesive.

9. The method of claim 4, further comprising providing a dyed adhesive, wherein the laminating or casting the film to the substrate is based on laminating using the dyed adhesive.

10. A method of manufacturing an eyeglass lens, goggle lens, or shield using a solution casting process, the method comprising:
providing a first soluble polymer solution;
providing a first dye solution comprising at least one of:
i) a dye attenuating narrow-band visible light with a full width at half maximum (FWHM) in absorbance of 10 nm-80 nm or infrared light, wherein the dye has a property of attenuating one of 400 nm-455 nm violet-blue light with at least 70% absorption, 570 nm-595 nm green-yellow light with at least 60% absorption, or 760 nm-2000 nm infrared (IR) light with at least 30% absorption without limitation to FWHM attenuation at 10 nm-80 nm; or ii) a dye having a property of attenuating one of 400 nm-455 nm violet-blue light with at least 30% absorption, 570 nm-595 nm green-yellow light with at least 20% absorption, or 760 nm-2000 nm infrared (IR) light with at least 20% absorption without limitation to FWHM attenuation at 10 nm-80 nm, and
adding the first dye solution to the first soluble polymer solution to form a first dyed solution;
casting the first dyed solution to form a first film;
providing a second soluble polymer solution;
providing a second dye solution comprising at least one dye having a property of attenuating one of 400 nm-455 nm violet-blue light, 570 nm-595 nm green-yellow light, or 760 nm-2000 nm infrared (IR) light;
adding the second dye solution to the second soluble polymer solution to form a second dyed solution;
one of: (a) casting the second dyed solution directly onto the first film to form an at least two-layer film, or (b) casting the second dyed solution to form at least a second film element to further laminate into an at least two-layer film;
providing a third soluble polymer solution;
providing a third dye solution comprising at least one dye having a property of attenuating one of 400 nm-455 nm violet-blue light, 570 nm-595 nm green-yellow light, or 760 nm-2000 nm infrared (IR) light;
adding the third dye solution to the third soluble polymer solution to form a third dyed solution;
one of: (a) casting the third dyed solution directly onto the at least two-layer film to form an at least three-layer film, or (b) casting the third dyed solution to form at least a third film element to further laminate into an the at least two-layer film; and
laminating or casting the at least three-layer film to the eyeglass lens to manufacture the eyeglass lens.

11. A method of manufacturing an eyeglass lens, goggle lens, or shield using a solution casting process, the method comprising:
providing a first soluble polymer solution;
providing a first dye solution comprising at least one of:
i) a dye attenuating narrow-band visible light with a full width at half maximum (FWHM) in absorbance of 10 nm-80 nm or infrared light, wherein the dye has a property of attenuating one of 400 nm-455 nm violet-blue light with at least 70% absorption, 570 nm-595 nm green-yellow light with at least 60% absorption, or 760 nm-2000 nm infrared (IR) light with at least 30% absorption without limitation to FWHM attenuation at 10 nm-80 nm; or ii) a dye having a property of attenuating one of 400 nm-455 nm violet-blue light with at least 30% absorption, 570 nm-595 nm green-yellow light with at least 20% absorption, or 760 nm-2000 nm infrared (IR) light with at least 20% absorption without limitation to FWHM attenuation at 10 nm-80 nm;
adding the first dye solution to the first soluble polymer solution to form a first dyed solution;
casting the first dyed solution to form a first film;
casting or laminating the first film onto the eyeglass lens; and
creating at least a one-layer film to laminate onto the eyeglass lens through two repetitions of the following steps:
providing each soluble polymer solution;
providing each dye solution, with at least one dye having a property of attenuating one of 400 nm-455 nm violet-blue light, 570 nm-595 nm green-yellow light, or 760 nm-2000 nm infrared (IR) light;
adding each dye solution to each soluble polymer solution to form each dyed solution; and
casting each dyed solution to form each film to laminate into the eyeglass lens.

12. The method of claim 1, wherein the laminating or casting comprises:
laminating or casting an additional color or film, clear film, or functional dye mixture film with the film to the eyeglass lens, goggle lens, or shield; or
applying the at least one one-layer film to an inside of the mold for co-injection molding to manufacture the eyeglass lens, goggle lens, or shield.

13. The method of claim 4, wherein the laminating or casting comprises:
laminating or casting an additional color film, clear film, or functional dye mixture film with the film to the eyeglass lens, goggle lens, or shield; or
applying the at least one one-layer film to an inside of the mold for co-injection molding to manufacture the eyeglass lens, goggle lens, or shield.

14. The method of claim 10, wherein the laminating or casting comprises:
laminating or casting an additional color film, clear film, or functional dye mixture film with the film to the eyeglass lens, goggle lens, or shield; or
applying the at least one one-layer film to an inside of the mold for co-injection molding to manufacture the eyeglass lens, goggle lens, or shield.

15. The method of claim 11, wherein the laminating or casting comprises:
laminating or casting an additional color film, clear film, or functional dye mixture film with the film to the eyeglass lens, goggle lens, or shield; or
applying the at least one one-layer film to an inside of the mold for co-injection molding to manufacture the eyeglass lens, goggle lens, or shield.

* * * * *